April 16, 1946.　　　　　A. MARKS　　　　　2,398,435
POLARIZING CRYSTALLINE FORMATION BY TRANSFER AND EXPANSION
Filed Jan. 11, 1940　　　10 Sheets-Sheet 1

INVENTOR
ALVIN MARKS.
BY Ostrolenk + Greene
ATTORNEYS

April 16, 1946.  A. MARKS  2,398,435
POLARIZING CRYSTALLINE FORMATION BY TRANSFER AND EXPANSION
Filed Jan. 11, 1940  10 Sheets-Sheet 2
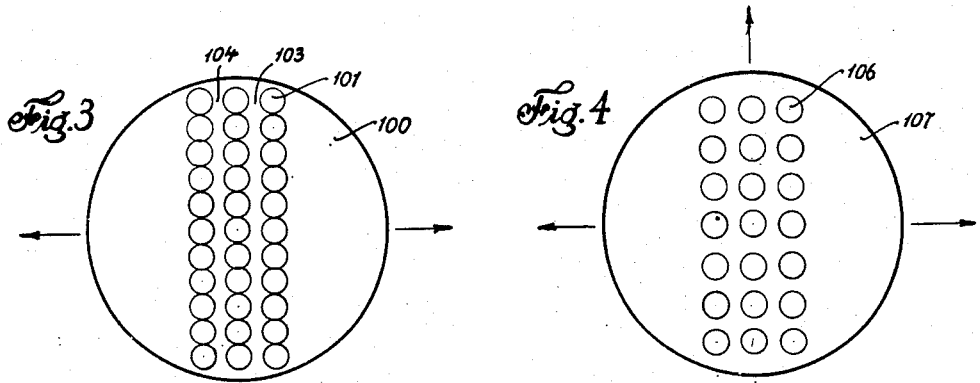
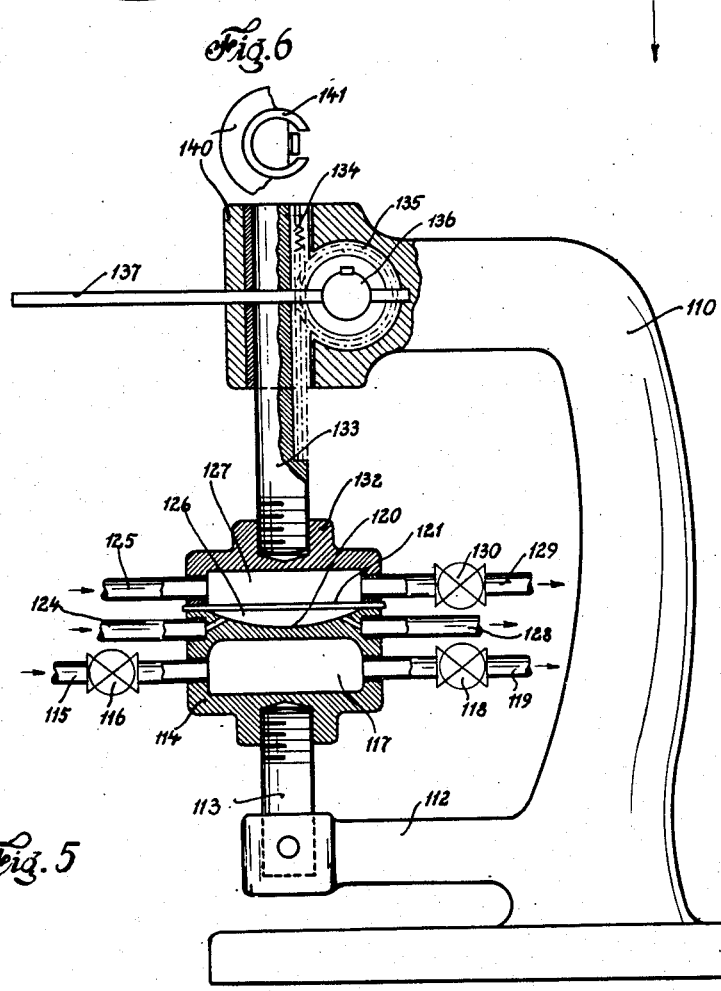
INVENTOR
ALVIN MARKS.
BY Ostrolenk & Greene
ATTORNEYS April 16, 1946.  A. MARKS  2,398,435
POLARIZING CRYSTALLINE FORMATION BY TRANSFER AND EXPANSION
Filed Jan. 11, 1940   10 Sheets-Sheet 3
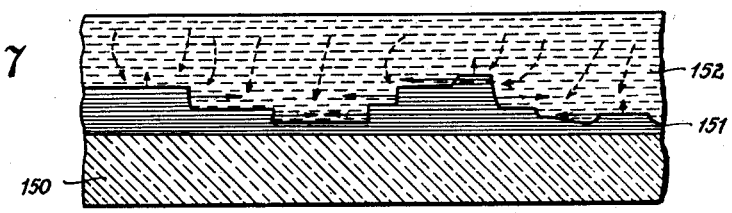
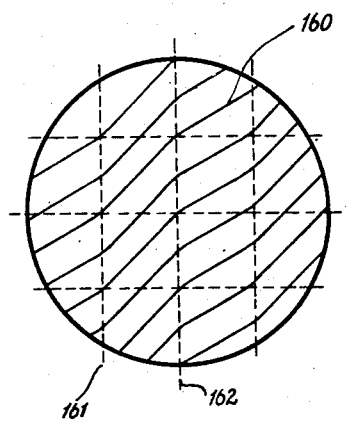
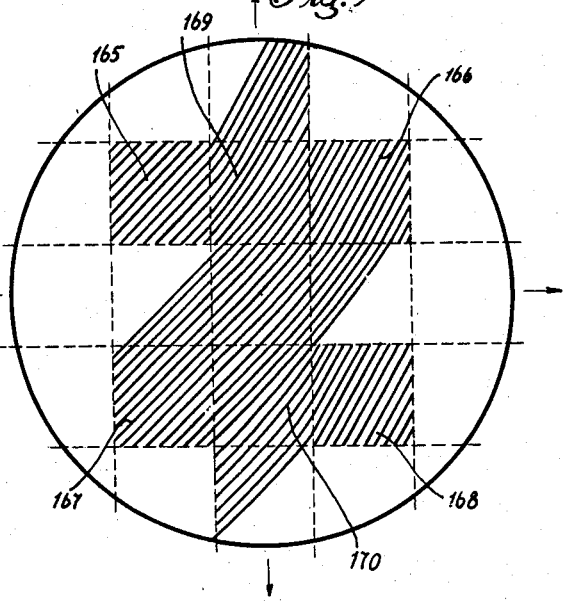
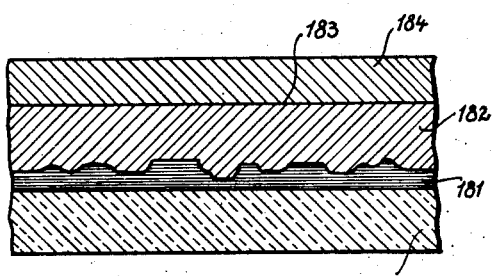
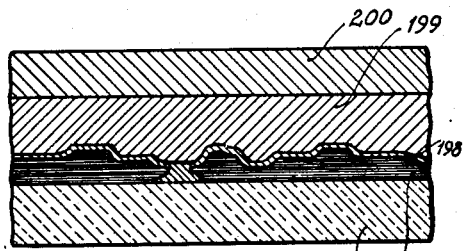
INVENTOR
ALVIN MARKS.
BY Ostrolenk + Greene
ATTORNEYS April 16, 1946.   A. MARKS   2,398,435
POLARIZING CRYSTALLINE FORMATION BY TRANSFER AND EXPANSION
Filed Jan. 11, 1940   10 Sheets-Sheet 4

INVENTOR
ALVIN MARKS.
BY
ATTORNEYS

April 16, 1946.  A. MARKS  2,398,435
POLARIZING CRYSTALLINE FORMATION BY TRANSFER AND EXPANSION
Filed Jan. 11, 1940  10 Sheets-Sheet 5

INVENTOR
ALVIN MARKS.
BY Ostrolenk & Greene
ATTORNEYS

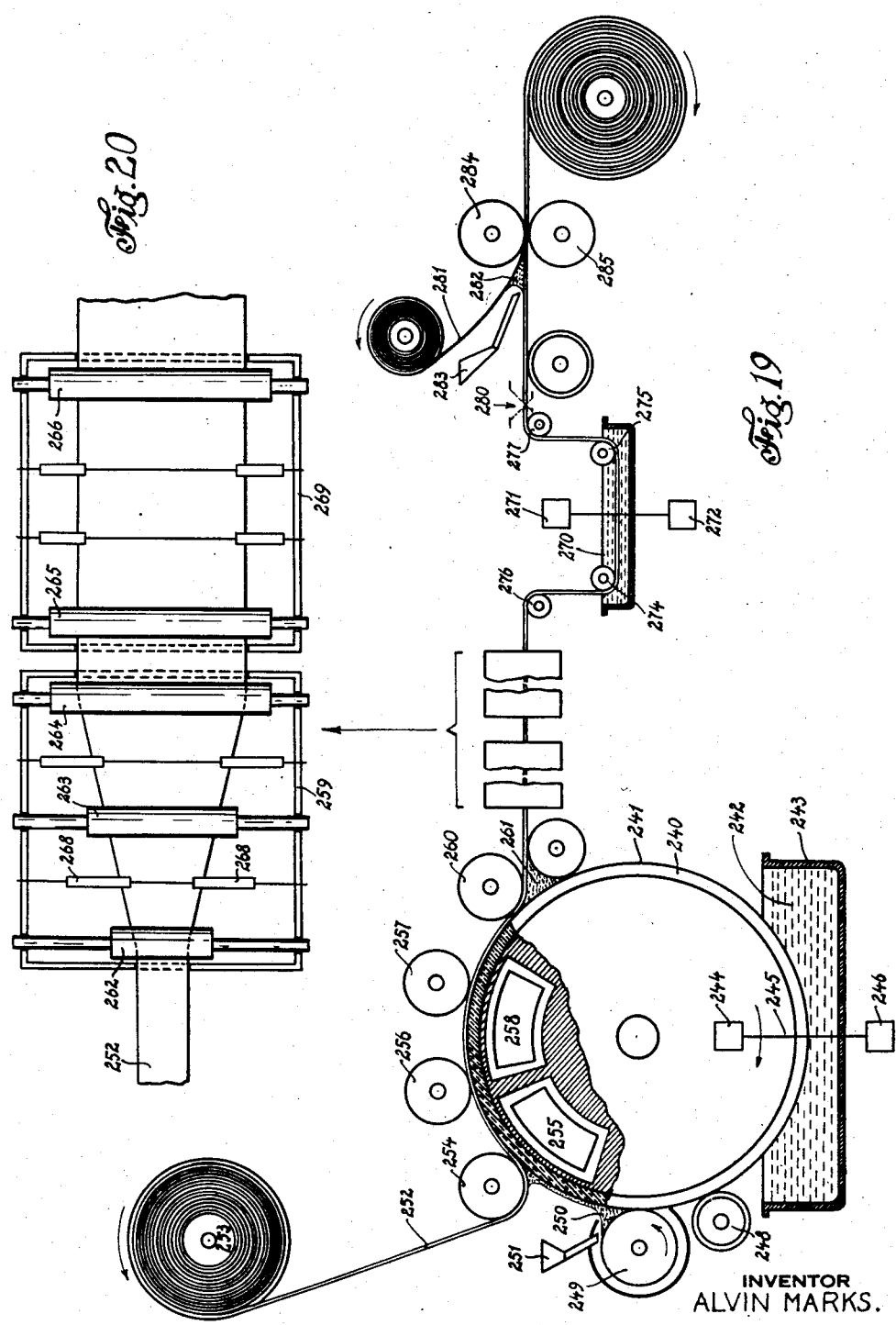

April 16, 1946. A. MARKS 2,398,435
POLARIZING CRYSTALLINE FORMATION BY TRANSFER AND EXPANSION
Filed Jan. 11, 1940 10 Sheets-Sheet 7

INVENTOR
ALVIN MARKS.
BY Ostrolenk & Greene
ATTORNEYS

April 16, 1946.  A. MARKS  2,398,435
POLARIZING CRYSTALLINE FORMATION BY TRANSFER AND EXPANSION
Filed Jan. 11, 1940  10 Sheets-Sheet 9

INVENTOR
ALVIN MARKS.
BY Ostrolenk & Greene
ATTORNEYS

April 16, 1946. A. MARKS 2,398,435
POLARIZING CRYSTALLINE FORMATION BY TRANSFER AND EXPANSION
Filed Jan. 11, 1940 10 Sheets-Sheet 10
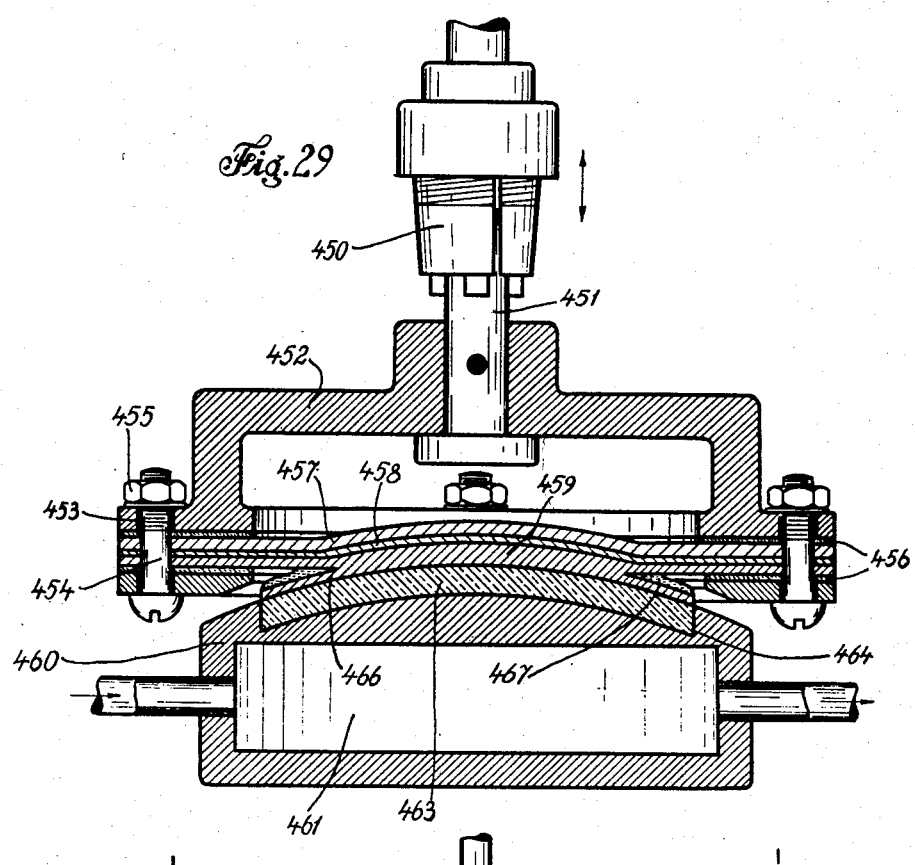
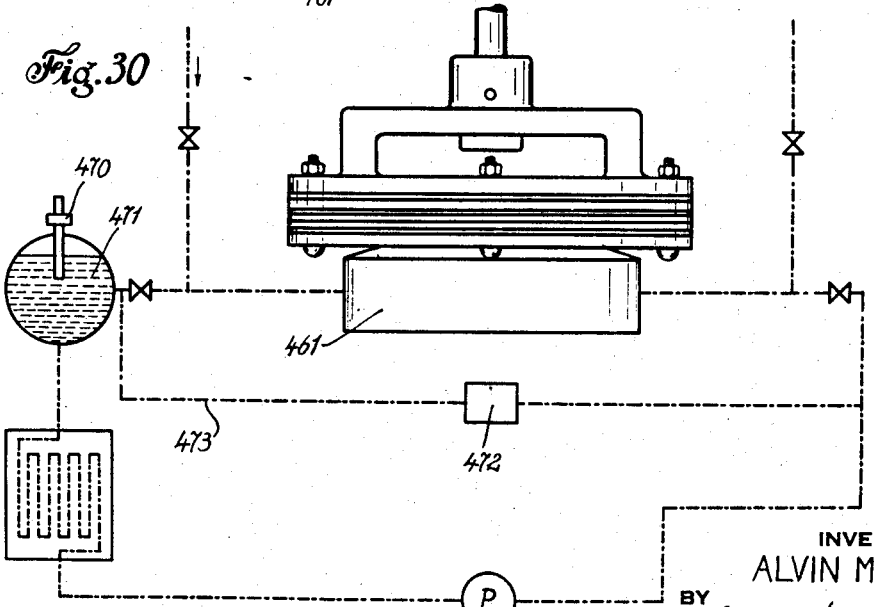
INVENTOR
ALVIN MARKS.
BY Ostrolenk & Greene
ATTORNEYS Patented Apr. 16, 1946

2,398,435

UNITED STATES PATENT OFFICE 2,398,435

POLARIZING CRYSTALLINE FORMATION BY TRANSFER AND EXPANSION

Alvin Marks, Whitestone, N. Y.

Application January 11, 1940, Serial No. 313,392

18 Claims. (Cl. 88—65)

My invention relates to the formation of a single continuous crystalline layer and more particularly my invention relates to a rapid and inexpensive method of producing polarized plates or films by transfer printing and subsequent replenishment of both the transferred and the transferring crystalline layer by means of a supersaturated solution of crystals.

My invention also relates to a method of forming a laterally enlarged continuous crystalline layer by transfer printing, expansion and subsequent replenishment by a supersaturated solution. By means of this step of expansion I may also form such continuous crystalline layer in varied shapes.

I use the word "printing" by analogy with the well known printing processes wherein a material is transferred by contact to a receptive medium. In the present instance the lattice work of atoms comprising the crystal structure on the transferring plate is preserved and this corresponds to the effect of placement of the components in printing.

By transfer printing I specifically refer to the process of substantially uniformly splitting in the plane of the support a continuous crystalline structure so that part of the said crystalline structure cleaves and transfers to a receptive medium such as a plastic sheet to which it adheres, while the remainder of the cleaved crystal remains upon its original support.

Although I have spoken above of effecting this transfer printing with a single continuous crystal, it is within the scope of my invention to effect this transfer with a multiplicity of separated crystalline masses upon a support. In this event by process controls I can obtain when necessary a substantially uniform cleavage of the crystals, i. e. the crystals uniformly cleave in substantially the same plane.

By replenishment, intensification or renewal, all of which I use interchangeably, I mean the building up of an incomplete crystalline layer by means of a super-saturated solution of the crystals.

By primary crystal, I mean the original crystal which may be attached to the original support and thereafter split or cleaved, the removed split or cleaved portion being termed the secondary crystal, and the support to which said cleaved portion is transferred on cleaving being termed secondary.

The basic concept of my invention lies in the rapid formation of continuous crystalline layers by first forming by known methods a crystalline layer upon a suitable support and then covering the exposed surface of the crystalline layer with an adherent flexible material so that when said adherent flexible material is forcibly separated from the original support upon which the crystalline layer is positioned, a part of the crystalline layer cleaves or splits from the original layer and is carried off by the adherent flexible material.

Following this, both the original crystalline layer, which has lost certain strata of its thickness, and the separated crystalline layer, which represents only a portion of the desired thickness, are built up to their desired dimensional thickness by subjecting them to a super-saturated solution of the crystalline material which I term the intensifying solution.

Under certain circumstances, as will be described hereinafter, I may effect a series of cleavages of the original crystalline layer whereby I obtain a plurality of cleaved or secondary crystals before it is necessary to rebuild the thickness of the original crystalline layer by means of the supersaturated intensifying solution.

By way of a general example, I may deposit upon a glass plate a continuous layer of crystalline material such as polarizing crystal iodo quinine sulphate or iodo cinchonidine sulphate. This is done according to the methods set forth in my Patent No. 2,104,949 and co-pending application Serial No. 147,650. Upon this deposited crystalline layer I cast or flow a solution of cellulosic material, such as, for example, cellulose nitrate, in suitable solvent, and after the volatile solvent has evaporated leaving a thin but strong cellulose nitrate film adherent to the crystalline layer, I pull the cellulose nitrate film from the glass support at one edge and as the cellulose nitrate film is pulled away, the crystalline film splits or cleaves along the plane of the support so that a layer of crystalline material goes with the cellulose nitrate film. This is because the adhesion between the cellulose nitrate film and the crystalline layer is stronger than the cohesion between the respective strata of the crystalline layer.

The crystalline layers which remain upon both the glass plate and the cellulose nitrate film are intensified or built up by subjecting them to a supersaturated solution of similar crystals.

If I desire to impart to the crystalline layers a non-planular shape as for example a toric curvature or if I simply desire to expand the support which carries the transferred crystalline layer to obtain a larger area thereof, I may directly after the cleavage operation cause the expansion of the cellulose nitrate film, by for example, heating the film to soften it and then stretching it by any desirable means, whereupon the crystalline structure is cracked and expanded, and by subsequent intensification again forms a continuous crystalline layer.

By the above process, thus simply set forth, I may continuously form and rapidly transfer upon suitable receptive media, crystalline layers that may be intensified to any desired thickness. It is of fundamental importance that in this transfer process I do not materially disturb the original alignment of the crystalline structure, but in fact the operation of expansion, particularly in the case of the polarizing crystal iodo cinchonidine sulphate or iodo quinine sulphate, may actually improve the alignment of the crystalline structure by tending to diminish the variation in crystalline direction as will be explained hereinafter.

For my crystalline layer I may use any suitable crystalline material and for the purpose of obtaining a polarizing layer I employ crystals of iodo quinine sulphate or iodo cinchonidine sulphate-$a$, such as is set forth in my Patent No. 2,167,899.

As the support for this original crystalline layer which may be deposited thereon in any desired manner, I may use a rigid support having a suitable inert surface such as glass, a hard styrol or urea formaldehyde resin; or I may use a flexible support such as, cellulose acetate, plasticized polystyrene, etc.

As the medium to which I cause the cleaved crystal to adhere upon separation thereof from the original support, I may employ any suitable flexible sheeting and I prefer to employ a plastic base material of sufficient strength and flexibility. For this purpose I have found cellulose nitrate, cellulose acetate, and cellulosic derivatives generally, as well as many resins, to be suitable. In some instances I prefer to employ a composite flexible sheeting such as cellulose acetate coated with a suitable polystyrene composition, so as to provide a crystal-backing having an index of refraction matching that of the crystalline layer.

Thus, a flexible secondary support may be employed to cleave the crystalline layer from a rigid primary support; or a rigid secondary support may be used to cleave the crystalline layer from a flexible primary support; or both primary and secondary supports may be flexible. Although I have succeeded in cleaving crystalline layers when both primary and secondary supports are rigid, it is quite difficult to accomplish a uniform cleavage under these conditions.

To gain the proper adhesion between the crystalline layer and the plastic medium to which a portion of said crystalline layer is to be transferred, I may either cast or flow said plastic medium in liquid form upon said crystalline layer to form a thin adherent coating thereon, or I may laminate a preformed film thereto by means of certain laminating media so that such a strong bond is obtained between the crystalline layer and the plastic that upon separation of said plastic film from the rigid support upon which the crystalline layer is positioned, a portion of said crystalline layer will adhere to the plastic.

I may also impress in a vacuum, or under great pressure, or in any suitable manner to eliminate or minimize the effect of air bubbles, the surface of the primary crystalline layer onto a suitable receptive medium and I may employ a heating and cooling operation to aid in the completion of the bond.

The impression in the secondary support may consist of a transferred layer, or may consist of isolated idented aligned crystals. In either case intensification will complete the secondary crystalline layer.

It is necessary that certain relationships between solvents, plasticizers and the plastic media employed be observed in order to prevent damage to the crystalline layer and to the medium upon which said crystalline layer is transferred.

It is also of great importance in this present process, in the case of the manufacture of polarizing films of a high degree of transparency, that the index of refraction of the supporting base be maintained generally to approximate that of the polarizing crystal thereon, and since the index of refraction when iodo cinchonidine sulphate-$a$ is used is about 1.60, it is then desirable that a material having a similar high index of refraction, as for example polystyrene, be employed.

However, since I have found that cellulose nitrate films have a relatively higher tensile strength than polystyrene films, I prefer to coat the polarizing crystalline layer first with a very thin coating of cellulose nitrate and thereover dispose as by coating or by laminating in preformed shape thereto a polystyrene composition film. Inasmuch as the cellulose nitrate film itself is of extreme thinness and since the polystyrene composition film has an index of refraction matching that of the polarizing crystal, the composite film will transmit optical images with substantially no blurring or distortion.

A second basic concept comprises the intensification or renewal to the original dimensional state of thickness and continuity of the cleaved primary crystal material, and also the intensification or building up of the printed or cleaved crystal upon the secondary support to a desired dimension of continuity and thickness.

By the "original dimensional state of thickness and continuity" of the primary crystal, I refer to a thickness and continuity sufficient for satisfactory cleavage.

By "desired dimension of continuity and thickness" I refer to the state of the secondary crystal in which it is continuous and of sufficient thickness to accomplish its function, which may be polarization in the case of a layer comprising a polarizing crystal.

A third basic concept comprises the printing, as described above, of a continuous crystalline sheet (or discontinuous crystalline field as above described) upon a plastic base which is substantially unyielding in the plane of its greatest dimensions at ordinary temperatures, but which plastic base is capable of becoming elastic under certain conditions. While in this elastic state, said plastic base may be expanded as by stretching in the plane of its greatest dimensions to a desired and controlled planular or curved final shape and size and thereafter caused to set and become substantially unyielding.

Thereafter, I intensify the crystalline sheet by subjecting it to a supersaturated solution in order to build up the crystalline layer to the desired dimension of thickness and continuity.

The expansion may be effected by first heating the plastic material by exposing it to a hot gas and then stretching or inflating the plastic. For example, polystyrene sheeting containing approximately 5 to 10 per cent plasticizer, such as dibutylphthalate is substantially unyielding in the plane of its greatest dimension at ordinary temperatures, but becomes elastic at a temperature of about 100 degrees centigrade, at which temperature it can be expanded and shaped.

Another method of expansion consists in inducing elasticity by subjecting the plastic material to a solvent either in liquid or gaseous phase, such as benzol or toluol, and thereafter stretching the plastic by a positive pull or by inflation by gas pressure. It is then desirable to permit the solvent to evaporate rapidly in an atmosphere of low humidity, whereupon the plastic again becomes substantially rigid.

The solvent used should be non-reactive with and non-solvent of the crystalline material which is printed upon the plastic support.

Another basic concept is the production of controlled curved shapes, such as spherical shapes, known also as toric shapes. I have shown two methods of accomplishing expansion to a controlled curved shape. The first method (see Figure 5) is effected by placing the flat printed plastic in a suitable mold. The lower part of the mold has the curved surface which it is desired to impart to the final crystalline product. The plastic sheeting is expanded downwardly against a curved surface because it is thus aided by the action of gravity and its original sag is immaterial. Such curved surfaces are useful for example in the production of toric polarized eye glasses wherein six base spherical curve is usually standard. The lower mold is provided with hot air inlets and hot air outlets, as is also the upper portion of the mold. The lower mold is also provided with an internal chamber wherein cold water can be circulated. In operation, the plastic having the printed crystalline surface usually facing upward is clamped between the flat outer surfaces of the upper and lower molds. Hot air is injected over the upper and lower surfaces of the plastic. This causes the plastic to become elastic or at least readily deformable. The lower chamber is opened to the atmosphere or preferably evacuated by a vent at its side and air pressure is introduced into the upper chamber, thus forcing the plastic against the curved surface of the lower die. Cold water is now circulated and the plastic cooled by contact with the cold metal surfaces of the lower die. This causes the plastic to become substantially rigid and to retain the shape given it by the lower die.

In a second method (see Figure 29 and description on pages 16 to 17 inclusive), I provide for the formation of controlled curved shapes by rigidly clamping the edge of a cleaved film as by means of coacting rings so that the film is held taut in the manner of a drum by the clamping rings. The crystal face is upward and the plastic base toward the convex surface of the lens to which the film is to be simultaneously laminated and expanded during motion of the drum downward. The lens surface may be suitably treated with a composition to cause the exclusion of the air during lamination, and to bond the film to the lens surface. In a modified procedure this operation can take place in an evacuated chamber. The lens is heated to a thermostatically controlled temperature during lamination-expansion, and thereafter the film is set by cooling, after which the laminated-expanded film is cut away from the clamping rings by a circular knife.

In undergoing the above expansion operation the continuous crystalline sheet is split laterally in many directions (see Figure 4). The continuous crystalline layer is restored by subjecting the above produced expanded plastic to standard supersaturated solution of the same crystalline substance or a substance which will form a mixed or isomorphous crystal with the base crystal.

By stretching in the plane of the plastic, polarizing sheets of greater length and width can be produced. As above outlined this may be done by subjecting the plastic with printed crystalline surface to simple stretching in one or more directions to produce an expanded flat sheet, subsequently causing the sheet to become non-yielding in the direction of its plane so that it retains its expanded lateral size and thereafter subjecting the said sheet to intensification to complete the continuous crystalline layer.

The primary purposes of the expansion and building up of the crystalline material is to rapidly form large crystalline areas by this step process, and secondly to form continuous crystalline layers in non-planular shapes. In this connection we may point out that great speed is inherent in the processes described herein, first because the original master blank may be replenished repeatedly and used for an indefinite number of times, and secondly the replenishing of the crystalline structure is exceedingly rapid since it occurs simultaneously over the entire surface so that any element of the crystal surface need grow only a very short distance to restore the original crystal continuity. This speed is inherent not only in the simultaneity of the process, but because of the small distances involved in the completion of the necessary crustal continuity and thickness.

The expansion of the printed crystalline material upon the plastic support is accomplished for two purposes, (1) $a$, the rapid increase of the size of the plastic sheet by simple expansion; $b$, production of controlled curved surfaces by differential expansion against a die surface; and (2) the expansion and subsequent intensification produce a more uniform continuous crystalline sheet with improved physical characteristics from the standpoint of crystalline formation; that is, better than when the crystal is formed from a deposit of crystalline material laid upon a surface according to older known methods. This improved structure results from the averaging of the crystalline axial directions during the intensification of the expanded crystalline structure. This phenomenon will be explained more fully hereinafter in connection with Figures 8 and 9 of the drawings.

I have found that under certain conditions of operation with semi-rigid and/or rigid primary and secondary members the transfer, splitting or cleavage of the crystalline layer during the printing operation may be more effectively accomplished if the process is performed under the surface of a liquid. The liquid may be water (that is, substantially a nonsolvent) or a saturated solution of the crystal employed. This is believed to be due to the effect of water in entering as a wedge to aid in splitting the crystal and also possibly to the lubricating action of the liquid during this separation. The phenomenon involved may possibly include the effect of surface tension, since water has a fairly high surface tension. The liquid used should be chemically inert, substantially non-reactive and non-solvent with respect to the crystal and the secondary plastic base layer.

In the case of water a slow reaction occurs with the iodo cinchonidine sulphate-*a* (I. C. S.-*a*) employed to produce continuous polarized crystalline sheets, but I avoid deleterious action by blotting or absorbing the excess water after the cleaving operation, or preferably by subjecting the cleaved sheet immediately to a washing with saturated I. C. S.-*a* solution in 10% water-3A ethyl alcohol solvent. Alternatively I employ as the liquid for cleaving a slightly supersaturated solution of I. C. S.-*a* in ethyl alcohol and water, or one of the higher alcohols and water.

The above described process of applying cleaved crystals by a printing method on to a receptive secondary base makes possible the continuous and rapid production of endless sheets of plastic material carrying a continuous crystalline layer.

I. C. S.-*a* is that form of iodo cinchonidine sulphate which is characterized by formation of thin hexagonal strongly light polarizing crystals which have the properties set forth in my Patent No. 2,167,899.

Accordingly, it is the object of my invention to provide a novel method for forming a crystalline film.

It is a further object of my invention to provide a novel method for forming a polarizing crystal by cleaving a master crystal into a plurality of laminae.

It is a further object of my invention to provide a novel method of forming polarizing films by coating a polarizing film with an adherent material and then stripping the adherent material from the crystalline layer so that a portion of the crystalline layer separates and adheres to the adherent material, after which the separated portions are intensified to a desired continuity and thickness.

It is a further object of my invention to provide an apparatus for continuously forming a single continuous crystalline film.

It is a further object of my invention to provide a novel process for improving a polarizing crystalline structure by expansion.

It is a further object of my invention to provide a novel process for forming a non-planular crystalline film.

It is a further object of my invention to provide a novel construction in which irregularities of the formation of the crystalline layer are compensated for by a contiguous material having a matching index of refraction.

It is a further object of my invention to provide a novel lamination of the polarizing material.

It is still a further object of my invention to provide a novel means for continuously controlling and regulating the thickness of a continuously formed polarizing crystalline layer.

These and other objects of my invention will be apparent from the drawings and the description thereof which follows:

Figure 3 is a schematic representation of a crystal layer expanded in one direction.

Figure 4 is a schematic representation of a crystal layer expanded in two directions.

Figure 5 is a side elevation and partial cross-section of an apparatus for imparting a non-planular shape to the crystalline film of my invention.

Figure 6 is a plan detail of Figure 5.

Figure 7 is a schematic cross-sectional showing of the accretion of the cleaved crystalline film of my invention.

Figure 8 is a schematic representation of the irregular striae of the polarizing crystal.

Figure 9 is a schematic showing of the improvement in the polarizing crystal by a straightening out of the striae after expansion of the crystal.

Figure 10 is a schematic cross-sectional showing of the irregularity of the cleaved crystalline layer and the correction of the resultant refractive deviations by means of a contiguous lacquer coating having an index of refraction which substantially matches that of the crystal.

Figure 11:
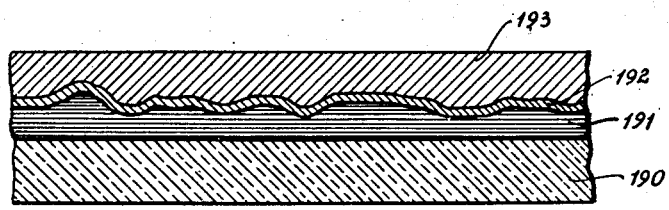

In Figure 11 I show a cross section of a modified form of my invention in which the crystalline layer is coated with the extremely thin coating of the strong cellulose nitrate lacquer over which is superimposed a plastic material having an index of refraction which substantially matches that of the crystalline layer.

Figure 12 shows a cross section of a modified form of my invention in which a crystalline layer mounted on a glass plate is coated with a thin coating of prelac over which a layer of plastic that has an index of refraction substantially matching that of the crystal is superimposed, and over this composite a strengthening layer of the cellulosic derivative is coated.

Figure 13:

Figure 13 is a cross sectional representation of a crystalline layer on a glass support, the crystalline layer being coated with a protective and bonding lacquer.

Figure 14:
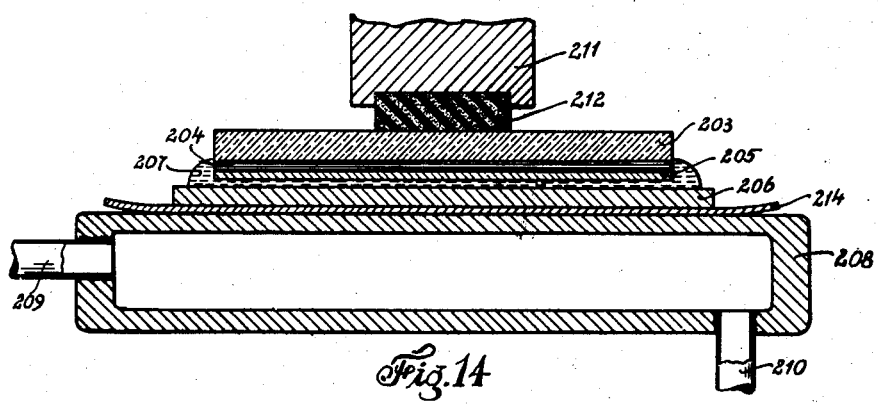

Figure 14 is a cross sectional showing of the manner in which I impress on the master plate shown in Figure 13 a plastic sheet which, upon being stripped from the master, carries with it a portion of the crystalline layer.

Figure 15:

Figure 15 shows a lamination of a cleaved crystal before stripping.

Figure 16:
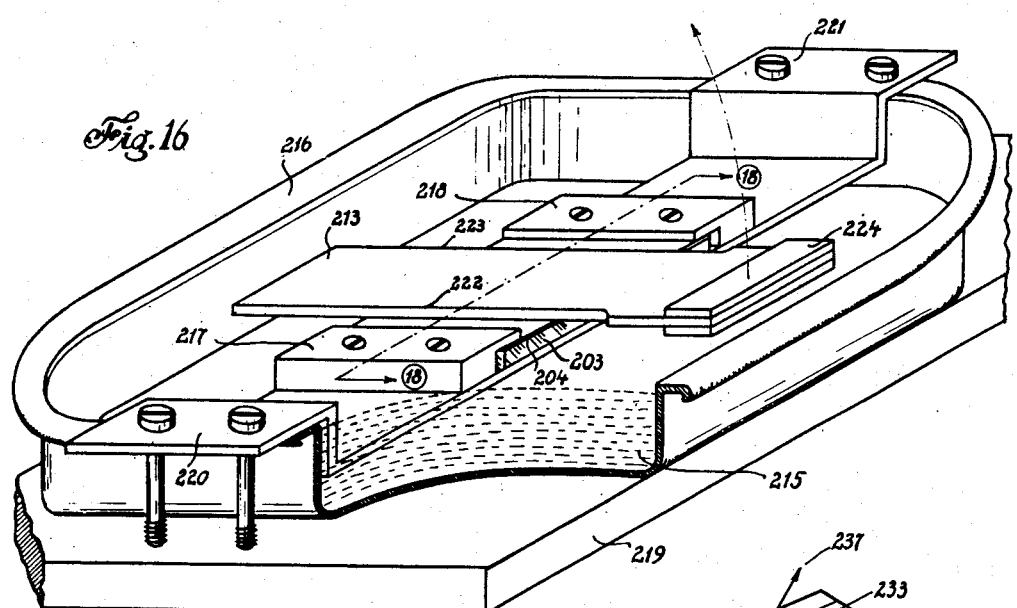

Figure 16 is a perspective view and partial cross section of a practical method for stripping a preformed adhered sheet from the crystalline layer to induce cleavage of the crystalline layer.

Figure 17:
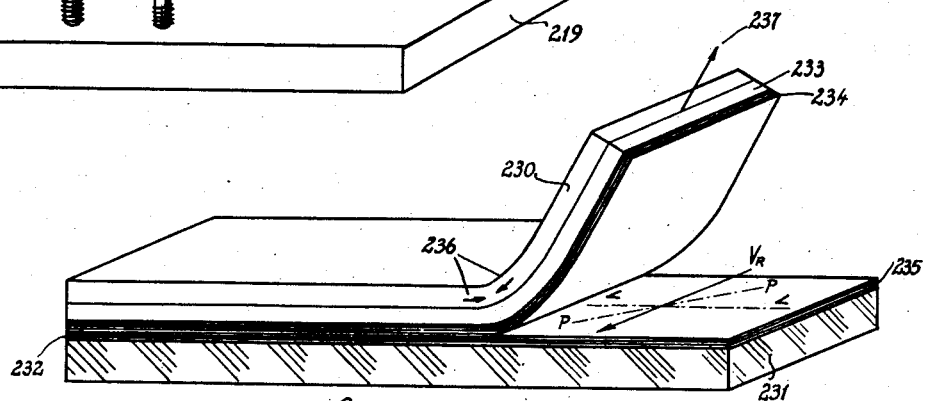

Figure 17 is a perspective view of the laminated structure of my invention in the course of being cleaved.

Figure 18:
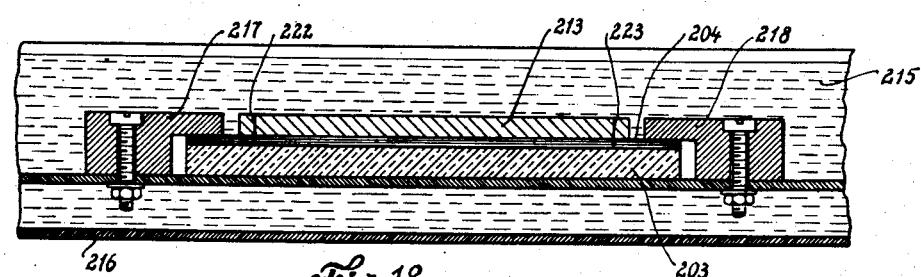

Figure 18 is a cross section taken along the lines 18—18 of Figure 16.

Figure 19 is a diagrammatic view in partial cross section of a continuous process for forming and expanding the cleaved crystal of my invention.

Figure 20 is a detailed plan view of the expanding apparatus of Figure 19.

Figure 21:

Figure 21 is a cross section showing complete lamination of my polarized film.

Figure 22:
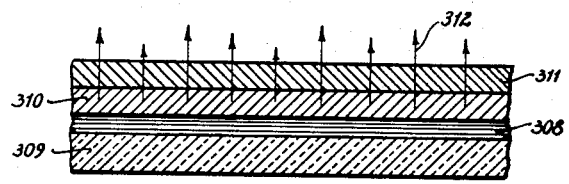

Figure 22 is a cross section illustrating another type of lamination with particular reference to the migration of the solvent by diffusion through the plastic.

Figure 23:
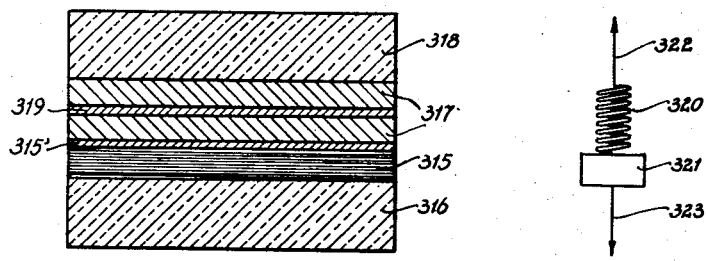

Figure 23 is a cross section of a lamination in which I provide a resilient layer adjacent the crystalline layer to provide protection for the crystalline layer against shattering.

Figure 24:
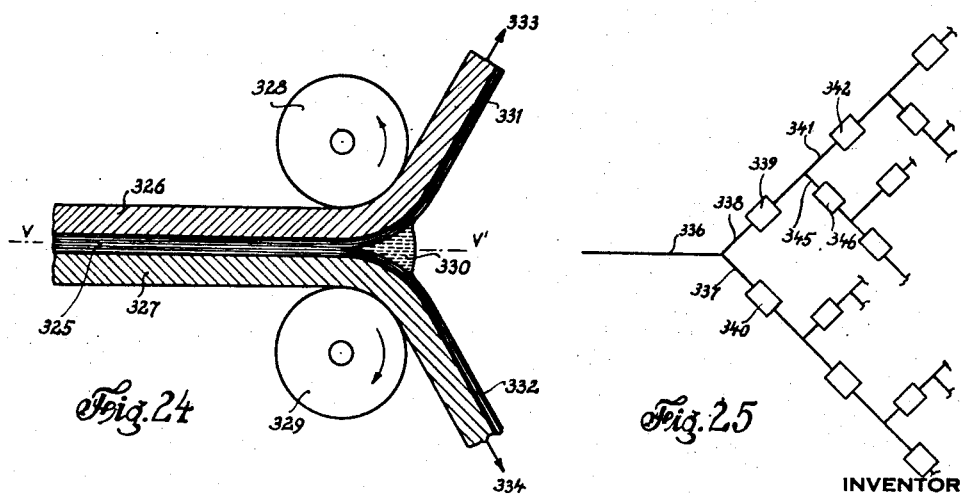

Figure 24 is a diagrammatic representation of a cleavage operation in a lamination comprising two external plastic layers and an interior crystalline layer in which the cleavage forms two polarized films from a single film.

Figure 25:
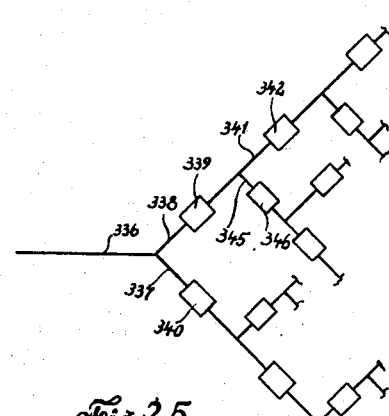

Figure 25 illustrates how the operation shown in Figure 24 may be used as a means for obtaining many such films rapidly from a single source.

Figure 26:
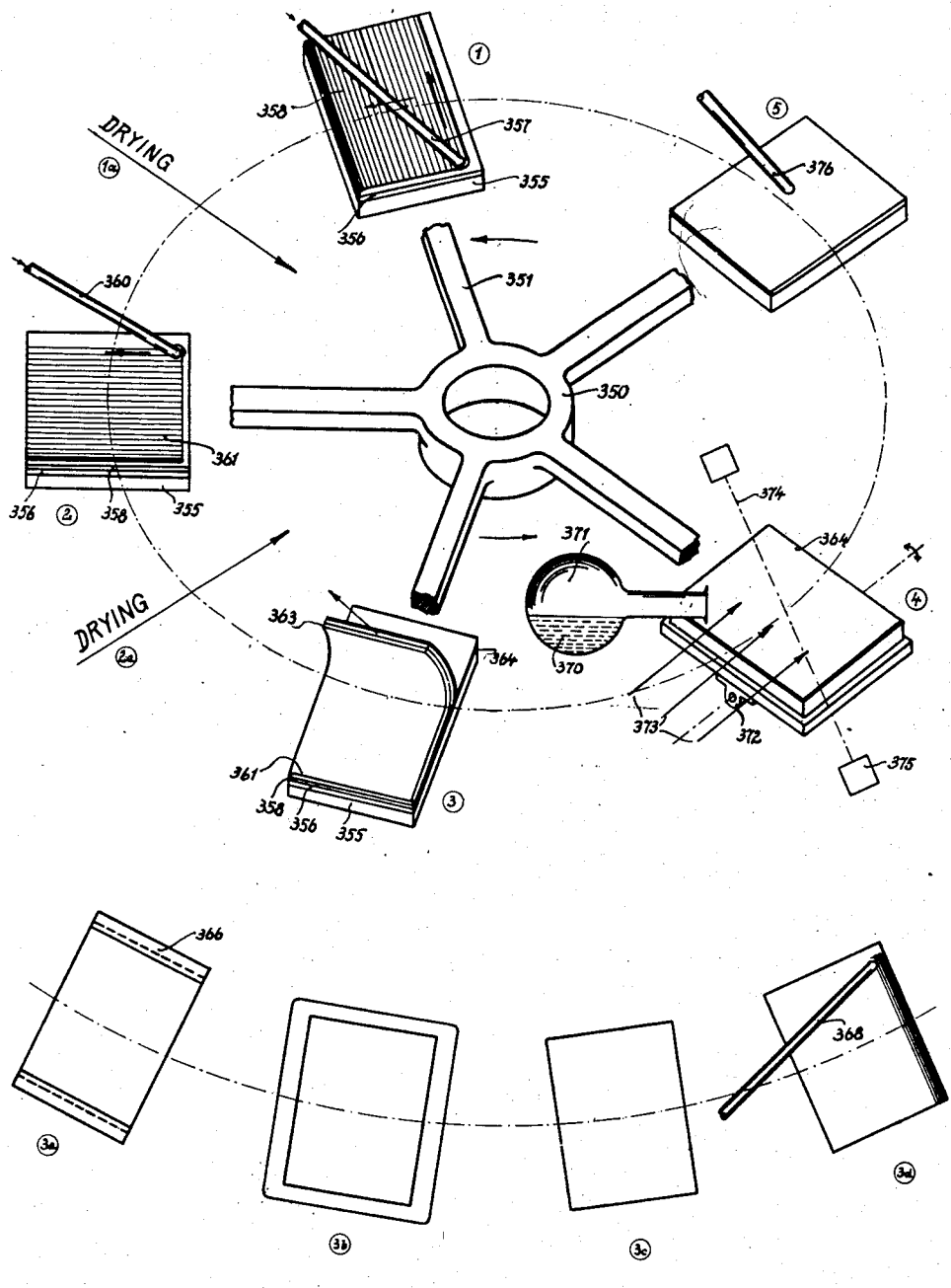

Figure 26 is a diagrammatic representation of a rotary operation for the production of the crystalline film of my invention.

Figures 27, 28:
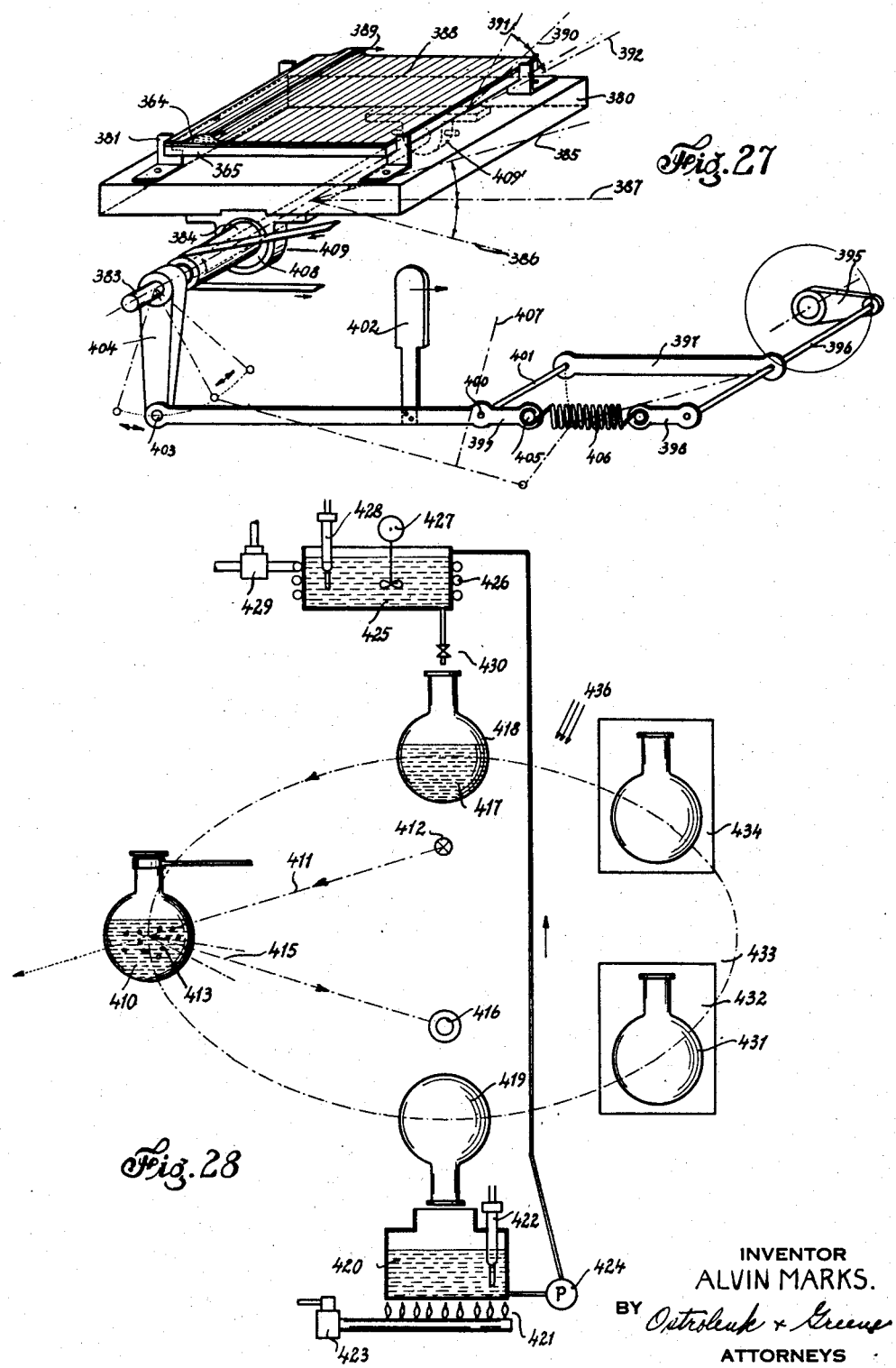

Figure 27 is a detailed diagrammatic representation showing the intensification step of one stage of the operation shown in Figure 26.

Figure 28 is a diagrammatic representation of a means for maintaining a supply of solution supersaturated for the purpose of the intensification step.

Figure 29 is a cross sectional side view of an apparatus for forming and laminating a toric shaped crystalline layer.

Figure 30 is a schematic representation of the system for heating and cooling the shaping apparatus shown in Figure 29.

Figure 1:
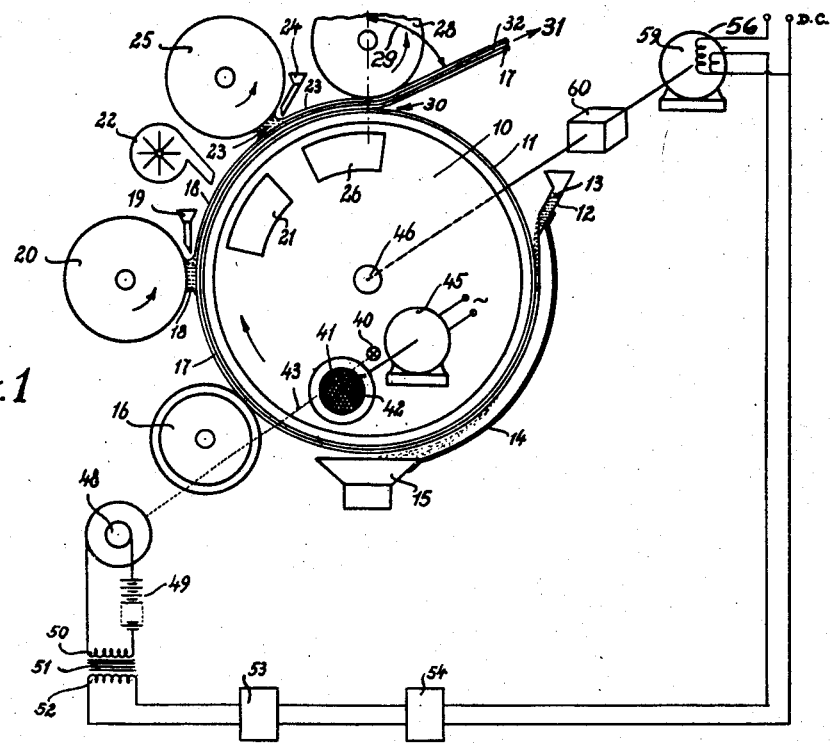
Figure 1 is a diagrammatic representation of an apparatus for continuously producing the cleaved crystalline layer of my invention.

Referring now specifically to the drawings, in Figure 1 I show an apparatus and method for the continuous production of plastic films carrying a continuous crystalline polarizing layer thereon, 10 is a drum on which was previously deposited a polarizing layer 11 as hereinbefore described. This polarizing layer is intensified and built up by means of the supersaturated solution 12 which may be applied from a hopper 13, by flowing, the excess being drained off by the guard 14 and the receptacle 15. The excess liquid is blotted by the absorbent roll 16, and, it will be noted, the intensified and dried layer of continuous crystalline material 17 is of greater thickness than the original cleaved crystal 11 since this crystal has now been intensified by the supersaturated solution 12.

The respective thickness of the polarizing crystal and the coating layers as they are built up thereon have been demarked and exaggerated in this diagrammatic showing for the purposes of clarity and actually, of course, the crystalline layer is not composed of two distinct layers as shown, but is a unitary crystal.

As stated the two thicknesses shown are to clearly indicate the additional thickness that is built up on the cleaved crystal 11 by means of the intensification solution 12.

The drum 10 with the intensified and dried layer of continuous crystalline material 17 now passes up and in contact with a fluid plastic material 18 supplied from a hopper 19, which plastic material is held in a pool by capillary action between the drum 10 and the small roll 20.

This plastic coating is for the purpose of providing a strong backing layer by means of which the cleavage of the crystalline layer may be more readily effected.

It will be noted that there need be no actual contact between the roll 19 and the drum 10 because of the capillary action of the fluid plastic therebetween and this is of importance inasmuch as it is desired to prevent any possibility of malformation of the continuous crystalline layer 17.

The drum 10 with the continuous crystalline layer 17 passing upward thereby becomes coated with a thin coating of the plastic material 18 and this coating is dried by evaporation of volatile solvent by heating means 21 and/or a dry air blast 22. The crystalline layer thus coated with the cellulose nitrate lacquer passes onward in contact with another pool of fluid plastic material 23 which may be a polystyrene cumar base lacquer and which is fed from a hopper 24.

As in the case of the initial coating, this second plastic coating is applied by means of a roll 25 which revolves in preferably spaced relation with the drum 10 and supports, by capillary action, the pool of plastic material 23 therebetween.

This plastic material 23 preferably comprises a polystyrene cumar base lacquer which is utilized because of its high index of refraction which substantially matches the index of refraction of the I. C. S.-$a$ crystalline layer 17 here used.

The film of polystyrene is then dried by means of heat from heating element 26 and a suitable dry air blast if desired and thus forms on the cellulose nitrate layer a coating of polystyrene having a high index of refraction.

The total thickness of the cellulose nitrate coating is approximately .001 to .0025 inch, although thicknesses outside this range could be utilized. I prefer the above recited range because it provides a backing film of sufficient strength to effect continuous cleavage, and also because that film is of such thickness that its curvature during the cleavage operation is sufficiently small that a maximum uniform cleavage force is exerted per unit of length.

Although I show the formation of the cellulose nitrate coating in a single application, it is within the scope of my invention to apply cellulose nitrate in two separate coats if greater speed of operation is desired. When the cellulose nitrate layer 18 is built up of two thinner coatings by a separate application a more rapid volatilization of the solvent may be effected.

The polarizing crystal with the plastic coatings thus provided passes under a retaining dry drum 28 which acts to control the radius of curvature of the separating plastic backing at the point of separation 30 and sets it at the optimum angle 29 to effect the cleavage of the polarizing crystal. The drum 28 also prevents the cleavage point 30 from travelling back into the uncleaved area.

The plastic film at this point is pulled upwardly at a controlled angle 29 as dictated by the curvature of the retaining roll 28 and direction of pull 31. Because the adherence of the polarizing crystal 17 to the cellulose nitrate film 18 is greater than the coherence of the polarizing crystal itself, the crystal splits or cleaves along the plane of the support which is the drum 10, so that the film which comprises the cellulose nitrate film 18 and the polystyrene film 23 superimposed thereover, carries off with it a layer comprising substantially half the thickness of the polarizing crystalline layer 17. The other half of the polarizing crystalline layer 17 remains on the drum and is indicated by 11.

As will be pointed out specifically in connection with Figure 20 hereinafter, this composite plastic film 32 carrying the layer 17 of the polarizing crystal may be expanded as by stretching and then built up by subjecting the crystalline layer 17 to the action of a supersaturated solution of the crystal, which I term my intensification solution. The intensification solution builds up the film 17 to the desired thickness. In addition to the expansion or concurrent therewith the film may be shaped to any desired form.

After this expansion the film passes into a bath comprising a supersaturated solution of I. C. S.-$a$ crystals in alcohol, water and dioxan, the dioxan being added to retard the formation of individual crystals in the solution or as a debris on the top of the crystalline film 17. I thus allow crystalization only on to the crystalline film 17.

As discussed elsewhere, this plastic film with the polarizing continuous crystalline film of proper thickness may now be laminated with another plastic sheet and may then be further laminated if desired between rigid transparent supports such as glass plates.

As indicated in Figure 1 the cleaved original polarizing crystal 11 on the drum 10 is then intensified to build it up again and then repeats the operation above described. Thus, I provide a continuous method for forming a crystalline film on a flexible medium.

In order to maintain optimum thickness for cleavage of the polarizing film 17, I provide means for controlling the thickness of that continuous crystalline layer before it is coated with the plastic. I accomplish this by an automatic regulation of the speed of the drum 10 which speed is controlled by the constantly measured thickness of the crystalline layer 17.

I provide a novel means for measuring the thickness of the polarizing materials which may be utilized to regulate any phase of their production, such as for example, the speed of revolution of the drum in this instance.

Although I shall particularly describe this control mechanism with regard to the apparatus here described, it is to be understood that it is within the scope of my invention to employ this control with respect to governing the adjustment of any physical factor which may enter into the production of a polarizing film since the control here is for the purpose of continuously measuring the polarizing effect of the travelling polarizing film.

I accomplish this by providing a light source 40 which passes through a revolving polarizing plate 41 which revolves about an axis 42 in the direction of the light beam 43. This provides thereby a light beam 43 in which the plane of polarization is revolving at a speed regulated by the revolutions of the polarizing plate 41. This is effected because the revolving polarizing plate 41 is in direct gear engagement with a synchronous motor 45 which maintains a constant R. P. M.

A modification of this device comprises a construction of a synchronous motor with a hollow shaft in which is maintained a polarizing plate, the light beam being directed along the hollow shaft.

Returning now to the particular construction shown in Figure 1, the beam of light with its plane of polarization revolving at a constant angular velocity passes through the transparent drum 10 and through the polarizing film 17 thereon and thereafter impinges upon a photocell 48, the photocell being of the light actuated type or of the type which requires an external actuating battery 49. In either instance a pulsating D. C. current is passed through the primary 50 of a transformer 51, the said primary being connected in series with the photocell 48 in the circuit.

The pulsating D. C. current acting on the primary 50 sets up a sinusoidal A. C. current on the secondary coil 52, the root mean square voltage of which is proportional to the variation in light amplitude of the beam which impinges on the photocell 48. It is evident that the light amplitude variation depends on the degree of polarization of the polarizing film 17 on the drum. This in turn depends upon the thickness of this polarizing film 17. For example, if the film were infinitely thin, polarization would be zero and the light amplitude variation would be zero. As the percent polarization of film 17 increases, the light amplitude variation correspondingly increases until, when the polarizing effect is at an optimum, the light amplitude variation is at a maximum. Thereafter, additional thickening of the film would cause a reduction of the light amplitude variation. Therefore, the thickness of the polarizing film can be gauged by the root mean square voltage produced on the secondary coil, and a particular root mean square voltage in any particular system will correspond to the optimum thickness for best cleavage.

By well known regulatory devices, such as resistance and cut out relays, the speed of the drum 10 may be regulated in accordance with the voltage impressed upon the secondary coil 52.

This voltage may be amplified by the amplifying means 53 and the thus amplified current conveyed to the rectifier 54, the D. C. output of which is employed to increase or decrease the voltage on the field coils 56 of the motor 59. The motor 59 is connected through gear box 60 to revolve the drum 10 on the axle 46. Thus the speed of the drum is continuously regulated by the thickness of the polarizing film.

The hereindescribed method of control, which is determined by the thickness of the polarizing crystalline layer, may be employed to control the period during which the cleaved crystalline layer on the plastic backing is subjected to the intensification solution.

If the film is too thin the root mean square voltage will be relatively low and the motor drive will be regulated to a slower speed which will effectively increase the thickness of the film. If the thickness should become excessive, the voltage would become too great and the motor speed would be correspondingly increased. These limits can be set sufficiently close together so that the variation in thickness will be within the desired limits. It is believed obvious that when the drum speed is increased the cleaved crystalline layer will be subjected to the intensification solution 12 for a shorter period of time and thus the resulting crystalline layer would be thinner than if a greater period of application of the intensification solution were employed. This speed regulation may be controlled by the light ray 43 passing through an area of the polarizing layer 11 which has not yet been completely intensified. In that event, the thickness of the polarizing layer through which the light ray passes is a fraction of the final thickness and the compensating regulation which is effected in the event this fraction of thickness is off standard, is effected prior to the completion of the intensification step.

The control method may also be employed in the manufacture of the colloidal suspension type of polarizing film in which polarizing crystals are suspended in a colloidal medium such as cellulosic derivative. The root mean square voltage is dependent upon the light intensity variation of the light passing through the polarizing film which, in turn, is a function of the thickness and the degree of polarization, per unit thickness, of the film. The root mean square voltage may here be utilized to control such factors as stretch, die slit dimension, speed of extrusion, etc. The light variations transmitted through a travelling polarizing film may be used to control such factor in the manufacturing process.

Recapitulating the general principles upon which the above described controls operate, it is pointed out that the film, the degree of polarization of which is to be measured, is travelling along at a continuous speed. In cooperation with this polarizing film, which moves in a single direction, I place a rotating polarizing plate above or below the plane of the polarizing film which is to be measured, and I project a light beam through said rotating polarizing plate and the polarizing film and this light beam after passing through the polarizing plate and polarizing film, is impinged upon a photo-electric cell, which is, as indicated, actuated thereby. The intensity of the light beam is thus made to pulsate sinusoidally because of its travel through polarizing plates which are revolving relative to each other. The thickness and polarization characteristics of the polarizing crystal on the polarizing film in this process determines the relative variations in intensity of the light beam. These variations are converted to a means for indicating the degree of polarization of the polarizing crystal and also are employed to effect the necessary controls to bring such polarizing crystal to the optimum thickness.

Figure 2:
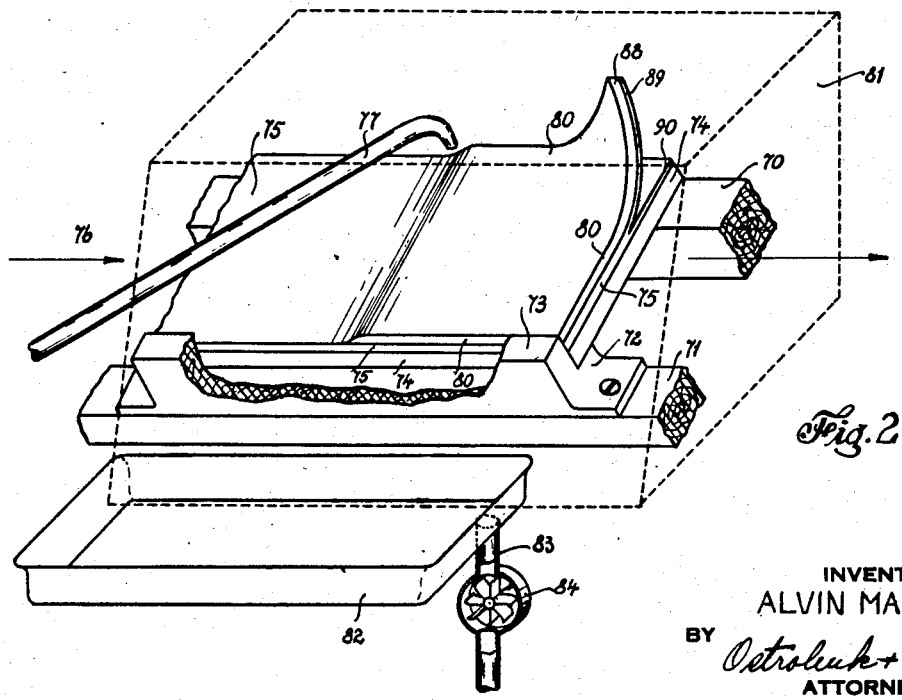
Figure 2 is a diagrammatic representation of a modified form of my invention for continuously producing a cleaved crystalline film.

Referring now specifically to Figure 2 I have there shown in diagrammatic form a perspective view of the manner in which my operation can be carried out in a simpler form without the automatic features I have set forth in connection with the continuous apparatus I have shown in Figure 1. Positioned on a travelling track 70 and 71 is a bracket 72 with an extending flange 73 and a glass plate 74 on which has been deposited a continuous polarizing crystal 75. The glass plate 74 with the polarizing crystal 75 deposited thereon travels in the direction indicated by the arrow 76. Through a tube 77 flows a plastic solution, as for example cellulose nitrate in a suitable solvent, and this solution flows on to the polarizing crystal 75 and dries thereon to form a film, as of cellulose nitrate 80. It is desired that the film be thin but flexible and strong. To facilitate the formation of this thin film I enclose the apparatus in a hood 81 and I may if desired flow hot air therethrough to hasten the evaporation of the volatile solvent. The excess of solution flows down and over the edge of the glass plate into the receptacle 82 and from there it travels through the pipe 83 and the pump 84. Thereafter it is strained and rejuvenated if necessary by adding additional volatile solvent.

By means not specifically shown here the corner 88 of the completed film is then pulled away from the glass plate 74 and this causes a cleavage of the polarizing crystal 75 so that a portion of the crystal 89 adheres to the cellulose nitrate film 88 and the remaining portion 90 of the polarizing crystal adheres to the glass plate 74. This cleavage in effect is transverse splitting, the crystal splitting along the plane of the glass plate 74. By this means I transfer a polarizing crystal on to an adherent plastic backing. Because the remaining polarizing crystal 90 on the glass plate is usually of insufficient thickness for reuse in the above described operation and because the polarizing crystal 89 on the plastic film 88 is of insufficient thickness for proper polarizing effects, I may subject both in a suitable manner to an intensification solution, which is a supersaturated solution of the crystal employed, whereupon the crystals are quickly built up to the desired thickness. If I desire to increase the size of the plastic film or to shape the plastic film with the polarizing crystal thereon to a particular non-planar shape I effect this preferably before the intensification step by expansion under mechanical or fluid pressure after first rendering the plastic film expandable.

Under certain conditions of operation more than one cleavage of the primary crystal may be effected before intensification is required. This is particularly the case when the secondary cleaved layer 89 is very thin and the primary crystal layer is relatively thick.

In Figure 3 I have diagrammatically shown the effect of a uni-dimensional expansion of the plastic film 100 with the polarizing crystal 101 thereon. The arrows at the side indicate the direction of expansion. It will be noted that the crystals are represented in a series of rings but this is for the sake of illustration only, and the crystal initially is in the form of a single continuous crystal that is split along the line as indicated leaving gaps 103 and 104. Also the side edges of these separated crystals are very irregular after stretching, but may be readily accreted by means of the intensification solution to a single continuous crystalline film.

In Figure 4 I show the effect of a two-dimensional stretch as indicated by the arrows and in this figure it will be noted that the crystals 106 on the plastic film 107 are now separated with spaces between them in both directions.

In Figure 5 I show diagrammatically an apparatus for expanding the plastic film carrying the polarizing layer into a spherical or other non-planular shape. As a support I provide a standard 110 upon a suitable base 111. An arm 112 extends out from the standard and in this arm is seated a rod 113 which is in engagement with a die 114 and the chamber 117. The chamber 117 is fed through a pipe 115 in which is located a valve 116. Fluid entering through the pipe 115 by valve 116 passes into the chamber 117. Obviously either hot or cold gas, vapor or liquid may be employed if desired. Valve 118 and pipe 119 provide for the removal of the fluid. In the upper portion of the die 114 is a concave die surface 120 against which is adapted to be pressed the plastic film 121 which carries on its surface the polarizing layer. For effecting the original softening of the plastic film 121 I provide pipes 124 and 125 which lead respectively as indicated into chambers 126 and 127, which chambers are respectively provided with exit pipes 128 and 129. Valve 130 regulates the flow of fluid through pipe 129.

The upper die 132 is secured on the rod 133 which carries affixed thereto a rack 134 which is actuated by a pinion 135 mounted on axle 136. Axle 136 is rotated by an arm 137.

Figure 6 is a cross sectional view looking down upon the rack mounted in the bearing 140 and shows more clearly the sleeve bearing 141 which permits the sliding movement of the rod 133.

In operation I insert the plastic film 121 between the upper die 132 and the lower die 114 and clamp it in place by bringing the arm 137 down thus actuating the pinion 135. The pinion 135 being in engagement with the rack 134 fastened to the rod 133 moves down the die 132 and clamps it against the lower die 114. I then pass hot gas or vapor through the pipes 124 and 125 to effect the softening of the plastic film 121 and I pass hot liquid or gas through the pipe 115 into the chamber 117 to heat the die surface 120. After the respective parts are thoroughly warmed, I shut the valve 130 and simultaneously open to the atmosphere or to a vacuum pump the pipes 124 and 128, whereupon the gaseous pressure in flowing through the pipe 125 forces the plastic sheet 121 down against the die surface 120, the gas in the chamber 126 between the plastic film 121 and the die surface 120 is forced out or evacuated through the pipes 124 and 128.

When the plastic film has thus been properly shaped against the die surface 120, the valve 116 is regulated so that in lieu of the hot liquid previously forced therein a cold liquid is admitted to the chamber 114 and this cold liquid chills the die surface 120 and causes the plastic sheet 121 to set in the non-planar shape imparted to it.

In Figure 7 I show diagrammatically the intensification or building up of the cleaved crystalline layer which is formed in my process. For purposes of illustration I have exaggerated the unevenness of the cleaved line and I have shown pits and holes in said crystalline layer. This intensification is illustrative of the building up or intensification of both the crystalline layer on the primary support such as glass as shown here, or on the secondary support such as a plastic film. The principles are exactly the same. Specifically in Figure 7, 150 represents the transparent rigid primary support, and positioned thereon is the crystalline layer 151 which may be of iodocinchonidine sulphate-a or iodo quinine sulphate or any suitable crystal which has the property of forming thin flat crystals of relatively large area and which have a substantially constant mass per unit area. This crystal has been cleaved as described in connection with Figure 1 and Figure 2 and a counterpart of the uneven crystal 151 has been split and transferred to a secondary plastic film support on which it is to be similarly intensified. The crystalline film 151 on the support 150 is then subjected to a supersaturated solution 152 which comprises crystals similar to the crystals 151, or are of the same type or of substances which are isomorphous thereto, the requisite being that crystallization from the supersaturated solution will proceed upon the cleaved crystalline base to form a substantially continuous crystalline layer homogeneous or compatible therewith.

If the supersaturated solution is made of I. C. S.-a, a preferred solvent is standard industrial denatured 3A ethyl alcohol: 1050 c. c.; water: 300 c. c.; dioxan: 320 c. c.; and I. C. S.-a: 19.2 grams. The solution is first heated to 70 degrees centigrade to dissolve all crystals and then cooled to 50° C. before application. The above solution will remain in saturated condition for extended periods of time (several hours) if the temperature is maintained at not less than 35° C. The solution should be carefully shielded from crystallization as seed crystals which may happen to enter the solution will cause the crystallization to occur relatively rapidly, which will make it necessary to employ a freshly prepared supersaturated solution to continue the process.

The presence of the dioxan seems to prevent the ready formation of nuclei within the supersaturated solution and also upon the surface to be intensified, thus preserving the supersaturated condition for longer periods of time and also producing a cleaner intensified film which is freer from excess crystalline debris which might otherwise deposit upon the top surface.

The supersaturated solution 152 so described is then applied to the cleaved crystalline layer 151 and the solute contained in the supersaturated solution then causes the accretion of the cleaved irregular crystalline layer 151 so that the crystal accretes laterally and vertically as indicated by the arrows in building itself up to a fuller and substantially uniform thickness. The substantially uniform thickness is a result of the natural tendency of the crystal to grow more rapidly in a lateral direction than in a vertical direction. I use longer lateral arrows and shorter vertical arrows to indicate the relative tendencies in the growth of the crystal faces.

In selecting the type of crystal to be used for this purpose it is important to bear this growth ratio in mind.

An essential of the process of my invention is the splitting apart of a crystalline coating of effective thickness, thus transferring a cleaved crystal layer to a secondary support; and then very rapidly rebuilding the cleaved crystal layer by an intensification step to the desired thickness in a very much shorter time than would be required to deposit the same size crystal by the methods of the prior art. This is because the cleaved crystal which remains on the primary support or which is transferred to the secondary support is very rapidly repaired by the lateral accretion of the crystal and these lateral and vertical accretions take place simultaneously over the entire area, the alignment of the crystal being effected by the cleaved framework which constituted the base.

Thus I provide a new means whereby a solution is caused to be converted to the solid continuous crystalline phase simultaneously over the entire area of a support. The tendency of a supersaturated solution merely poured on a glass plate and then allowed to crystallize is to cause individual crystals to form in random directions and become attached haphazardly and insecurely to the support. The resulting effect in the case of polarizing crystals is a dark mud-like mass on the support.

The principle of a cleaved continuous crystalline framework attached securely to a support according to the process I have set forth solves the problem of adhesion of the completed crystal to its support and also provides the alignment framework so that by mere accretion a full and continuous crystal of desired dimensions and with predetermined alignment is formed.

Thus I have here provided an extremely rapid method for the continuous production of polarizing material having properties such as shown in my prior Patents No. 2,104,949 and 2,167,899 and my co-pending application No. 147,650 in which the polarizing material is formed by deposition and intensification.

Turning now to Figures 8 and 9 which diagrammatically show the improvement in the crystalline structure that results when the expansion of the plastic sheet carrying the crystalline film is effected, Figure 8 shows in exaggerated form the slight wandering of the crystalline axes 160 which may occur in the original deposited crystal. The variation in the angular direction of the axis of the crystal lattice is caused by the initial method of deposit wherein the orienting forces may be insufficient to produce an absolute alignment but are sufficient to orient the deposited crystal lattice within say plus or minus 1 or 2 degrees of the mean direction. The result is a crystalline structure in which the lattice framework may be strained so that the distances between the atoms of the crystalline lattice are greater in some areas than in other areas. Thus, while the continuity of the crystalline structure is not necessarily effected, the axis may wander. This wandering of the axis usually takes place in noticeable waves which may themselves be visibly manifested as striae particularly in the case of polarization plates wherein slight angular deviations may become quite apparent when the polarizer and analyzer are crossed. This angular deviation or striation while slight and of little importance in the majority of uses of such crystalline structure, may somewhat detract from their efficiency, and moreover may be considered unsightly under certain circumstances.

The transfer process of my invention is such that it is possible to very carefully select or manufacture an extremely perfect primary crystalline surface and the cost of so doing is of little importance, inasmuch as a great many transfers may be taken from the primary master blank each of which are as perfect as the master blank itself which enables the cost of manufacturing the master blank to be spread over the relatively large number of transfers.

It is one of the objects of my present invention to make a more perfect continuous crystalline layer such as a polarizing crystalline layer by the expansion of such a wandering axis crystal and the rebuilding of such crystal by means of a supersaturated solution, which rebuilt crystal is characterized by the fact that variation of axial direction will have been eliminated or diminished almost to the point of non-existence. Moreover, such slight variations as do exist will be averaged in a random way over the entire surface so as to substantially eliminate this undesirable striation effect.

In accordance with the above description, Figure 8 shows the original crystal with the varying directional axis diagrammatically illustrated and Figure 9 shows the same crystal after it has been expanded and rebuilt by intensification.

In Figure 9, 165, 166, 167 and 168 are adjacent expanded crystalline areas which have broken apart from the continuous crystalline layer as a result of the expansion. The areas are shown as squares merely for the purpose of easy representation, but are actually of broken or irregular shape. The expanded areas shown in Figure 9 upon being subjected to the process of intensification grow more rapidly in a lateral direction than in a vertical direction (the lateral direction being shown, the vertical direction being, with regard to this showing, omitted). Moreover, I have found that the crystalline nucleus 165 may grow laterally at a slower rate than the adjacent crystalline nucleus 166. This differential in accretion may be due to the unequal distribution of solute in the supersaturated solution or it may depend upon the size of the particular cracked nucleus which is a split section caused by the physical expansion and tearing away of the various nuclei 165 and 166 from each other, as shown. Thus, the area of change in axial direction in the crystalline lattice indicated at 169 may be in this case close to the nucleus 165, whereas in the case of the crystalline nucleus 167 this may grow laterally more rapidly than the adjacent crystalline nucleus 168. In this case the area of change in axial direction 170 may take place much closer to the nucleus 168. It will be noted that the areas of change in the axial direction of the crystalline lattice before expansion, as shown in Figure 8, are in substantially straight lines 161 and 162 and thus may give rise to the appearance of the striation when observed under crossed polarizer and analyzer.

The areas of change in axial direction after expansion, as shown in Figure 9, are no longer in a straight line but rather as indicated at 169 and 170 are now located in random or staggered positions throughout the entire crystalline field so that the striation effect referred to by the alignment of the areas of changes in he axial direction are now substantially eliminated.

In addition to the elimination of the striations by the averaging or scattering of the areas of directional change, I may effect the actual improved alignment and straightening out of the variously directioned axis by stretching in the direction substantially along the line of the axis of the crystal. For purposes of availing myself of the averaging effect and the random scattering of the areas of directional change referred to above and also to effect the physical expansion of the crystalline film and support, I may also effect transverse stretching, which transverse stretching is preferably to a lesser extent.

Therefore in order to obtain a more perfect continuous crystalline structure I expand a crystalline layer which is positioned upon a plastic support so that expansion primarily takes place substantially along the line which corresponds to the axis or polarizing axis of the crystal, if it be a polarizing crystal. This primary stretch tends to straighten out the crystalline axis. At the same time by means of this primary stretch and by means of a stretch at an angle normal thereto in the plane of the support I cause such separation of the crystalline mass that because of the variation in the growth or accretion of the various crystals, there is a random distribution of the areas of change of axis such that the resulting rebuilt expanded continuous crystalline film has greater actual and apparent uniformity and lesser deviation from the mean direction of the crystalline axis and as a result the striations are substantially eliminated.

In Figure 10 I show in detail, with an exaggerated showing of the respective dimensions of the component parts of the structure, one of the forms of my invention. On a support 180, which is shown here as glass, there is deposited a crystalline layer 181 which has certain undulations which for the purpose of clarity have here been exaggerated. Such undulation if present either in the unprotected film or if the said film is protected with a transparent lacquer of an index of refraction different from the crystalline material would cause refractive deviation of the rays passing through the layer. Such refractive deviation may be objectionable for certain optical purposes, particularly when optical clarity is desired. This applies particularly to uses where image transmission without clarity loss is essential. The effect of such undulations may be entirely overcome by coating the undulating surface of crystalline layer 181 with a lacquer 182 which in the solid state has an index of refraction substantially the same as the crystalline material 181. This high index of refraction material 182 fills in the undulations of the crystalline surface and is given a perfectly plane outer surface 183. To compensate for the ray deviation caused by the undulations in the crystalline layer, the lacquer film 182 must not be too thin, but must be of sufficient thickness so that it constitutes a layer that while matching the undulations of the crystalline layer 181, at the same time has a planular outer layer 183. The structure shown in Figure 10 may be, for example, the structure of a primary supporting plate coated with a crystalline layer 181 having undulations, and over this undulating layer of crystalline material 181 is a compensating layer of refraction material such as polystyrene, again coated with a second lacquer coating 184, the purpose of which is to provide for increased strength of the film during the process of stripping. For example, 184 may be a cellulose nitrate lacquer with appropriate fillers to lend flexibility and adhesion and plasticizers such as are well known in the art.

In this construction a polystyrene film provides the index match necessary for optical perfection, while the cellulose nitrate provides the necessary strength and flexibility of the film for the purpose of effecting a satisfactory cleavage.

I have found that when pure polystyrene is incorporated in a lacquer film over a continuous crystalline layer, the crystalline forces cause the initially isotropic state of the film to change to the anisotropic state resulting in shrinkage of the polystyrene to produce cracks which lie usually in parallel directions with reference to the crystalline structure. Thus, the isotropic state of the polystyrene is gradually destroyed and the polystyrene molecules are lined up, that is, induced crystallization of the polystyrene sets in over the crystalline surface. The cracks in the polystyrene cause physical deterioration of the crystal owing to the escape of water and iodine vapor from the exposed crystalline surface. Reversion to the anisotropic state can be prevented by the inclusion of various resins such as aroclor, cycloparaffin or cumarone-indene. I prefer to use cumarone-indene, for example, in the proportions of equal parts of polystyrene and cumarone-indene by weight. When polystyrene is in direct contact with the crystalline layer, I propose to employ polystyrene and a resin filler composition such as I have set forth hereinbefore. When utilizing cellulose nitrate, the usual commercially available lacquers have proven satisfactory since there is less tendency in cellulose nitrate lacquers to crystallize and crack as against polystyrene.

Turning now to Figure 11 which represents another form of my invention I show a support 190 and deposited on that support a layer of continuous crystalline material 191, such as I. C. S.-a. It will be noted that the crystal has a surface which may contain undulations. Over these undulations I form a very thin coating of cellulose nitrate to provide a relatively thin, strong and flexible coating 192 which it will be noted, follows completely the undulations of the crystalline layer.

Over this undulating cellulose nitrate coating I form a thicker coating 193 of a material having an index of refraction which substantially matches that of the crystalline layer 191. The thin intermediate layer 192 of cellulose nitrate has the necessary strength and flexibility to aid in the cleavage of the crystal 191 but since cellulose nitrate has a lower index of refraction (1.50) than the I. C. S.-a crystal (index of refraction approximately 1.60) the cellulose nitrate film must be sufficiently thin so that the undulations of the crystal are followed by the cellulose nitrate on both its upper and lower surfaces. The overlying layer 193 has substantially the same index of refraction as the crystal, that is approximately 1.60 and may be, for example, a polystyrene-cumarone-indene material. Inasmuch as one surface of layer 193 closely follows the undulations of the crystal 191 while the other surface of 193 is planular, a compensation of ray deviation occurs and the composite is capable of transmitting images without distortion.

Referring now to Figure 12, 196 is the primary support, such as glass, containing thereon a continuous crystalline layer 197 which for example may be I. C. S.-a, a polarizing crystal. In the foregoing, the process of intensification has been described in which an alcoholic supersaturated solution covers the base crystal and causes the continuous crystalline film to be built thereon.

After this process is completed a clear lacquer may be directly flowed or preferably sprayed on the surface which at the same time first flushes away the excess intensification solution. The cellulose nitrate or polystyrene in butyl acetate composition solvents may be utilized. However, particularly in the case of the polystyrene lacquer, the plastic curdles when first brought into contact with the alcohol containing intensification solution and requires considerable lacquer to flush away the solidified or curdled plastic lumps which first form. Moreover, inasmuch as the crystal is alcohol soluble but only slightly butyl acetate soluble, the tendency is for the plastic layer to contact the crystalline surface with something less than complete adhesion. Moreover water or intensification droplets frequently become entrapped in openings or pockets in the crystalline layer and such retained pockets of solution may act to cause the films to peel or produce small holes or otherwise undesirable flaws.

I have found a satisfactory method of overcoming the above difficulties as follows: I provide a gum or resin which is soluble in my intensification solution, such as for example, an alcohol modified cumarone indene resin, known commercially as hard Nevillac. This resin is also soluble in toluene and butyl acetate as well as alcohol. This solution which I term Prelac is flowed onto the crystalline surface after the intensification has been completed. The Prelac solution is entirely miscible with the intensification solution and acts to admix with and flush away the intensification solution. The Prelac solution thereupon evaporates, leaving a thin coating of the resin 198 upon the surface of the crystalline film 197. Owing to the miscibility of the Prelac solution with the intensification solution, the resin enters intimately into contact with the crystalline surface and is even able to penetrate any pockets or holes which may exist in the crystalline film.

Prelac solution may be of the following composition: one part hard Nevillac, 4 parts 3A ethyl alcohol, 9 parts butyl acetate, all by weight. In order that the Prelac solution have no dissolving action upon the crystalline film, I saturate the above combination by placing one-half gram of iodo cinchonidine sulphate per liter in the above solvent and heat to fifty degrees centigrade, allow it to cool and finally filter off the excess iodo cinchonidine sulphate. The saturated resulting filtrate, I term Prelac.

Referring again to Figure 12, after the Prelac has been applied in a thin film 198, I may then apply polystyrene-cumarone indene lacquer 199 in any suitable solvent, such as for example, toluol. The polystyrene, the Nevillac and the toluol are all mutually compatible so that the line of demarkation 198—199 would tend to disappear in the more or less complete amalgamation of the preceding three elements and a perfect bond will be made between the lacquer 199 and the surface of the crystalline film 197. Upon the hardening of the lacquer 199, I may then apply a further strengthening lacquer coat 200 as for example cellulose nitrate, as before described.

Turning now to a modified form of my invention in which I accomplish the transfer not by casting a plastic directly upon the crystalline layer but in which I effect the transfer by laminating a preformed plastic sheet to the crystalline layer, I show first in Figure 13 a master plate from which the crystalline film is cleaved and transferred.

Here I show a rigid supporting plate 203 which may be of glass, and deposited thereon a coating 204 which is a continuous crystalline layer. Superimposed over the crystalline layer is a protective and bonding lacquer 205 which may for example comprise a polystyrene-cumarone indene coating.

In Figure 14 I illustrate the manner in which this master plate 203 is laminated to a preformed plastic sheet, such as a sheet of polystyrene 206, the lamination being assisted by a laminating oil 207. The laminating oil may, for example, comprise a mixture of cyclo-paraffins 207, such as are sold under the trade names Nevillite No. 1, and Neville oil, in the proportion of 20 parts to 12 parts by weight, respectively. Under the polystyrene sheet 206, I provide a protective sheeting 214 as of cellulose acetate which acts to keep the surface of the polystyrene intact and to provide for separation from the heat and pressure die 208 through which a circulation of heated fluids may be had by means of the pipes 209 and 210.

Pressure is applied by means of a pressure block upper die 211 and the resilient rubber pressure block 212. When the assembly of master plate, polystyrene sheet and laminating oil is made as shown, the assembly is heated and subjected to a relatively light pressure on the order of 10 pounds per square inch and the composite thus laminated is shown in Figure 15, and it will be noted that the lacquer 205 has coalesced with the polystyrene sheet 206 to form a unitary sheet 213.

I may modify the operation shown in Figure 14 by eliminating the laminating oil 207 and the lacquer coating 205 by providing that the operation take place in an evacuated chamber. Thus 214 may be cellulose acetate sheeting, one surface of which is coated with a fifty-fifty polystyrene-cumarone indene plastic layer 206. The master plate 203 carrying the polarized crystal 204 may be then impressed, in an evacuated chamber, directly against the heated and softened surface 206. The combination may then be cooled by passing cold water through 209 and 210 which hardens the plastic layer 206 and seals it against the polarized crystalline film 204. The composite 214—206 may then be stripped away from the master plate 203 leaving a secondary crystalline film upon the surface 206 and leaving a primary crystalline film upon the master plate 203.

I have found that under suitable conditions, this process may be repeated as many as ten times obtaining ten separate secondary films from a single master plate before reintensification of the master plate is necessary. After this intensification or rebuilding, the process above described may be repeated. The process may be continued indefinitely as long as the primary plate has not been damaged.

By means of this process I can separate a multiplicity of secondary crystalline layers from a single primary crystal, by splitting off successive cleavage planes therefrom. This process may be continued until the thickness of the primary crystal has been almost exhausted, after which the thickness of the primary crystal may be renewed.

The next step in a modified form of my invention (see Figure 16) comprises the cleavage of the crystalline layer 204 and I effect this by preferably first clamping the primary supporting plate 203 in a bath of saturated I. C. S.-a 215 which is contained in the tank 216. The glass plate is held by means of clamps 217 and 218 and the tank is secured to a suitable support 219 by means of the end plates 220 and 221. Then, to facilitate the cleavage, I slit along the sides of the plastic according to the lines 222 and 223. A clamp 224 is secured to one end of the preformed polystyrene sheet 213 and an upward pull is exerted in the direction indicated by the arrows. It is to be borne in mind that the separation takes place below the surface of the saturated solution of I. C. S.-a in alcohol and that further, it is my understanding that this liquid during the process of splitting aids separation because of the wedge-like or surface tension action of the liquid. This cleavage is well illustrated in Figure 17 which illustrates the cleavage of the crystalline layer as effected not only in the process above described but also in connection with the casting process I have set forth above specifically in connection with Figures 1 and 2.

I have found that by employing a specific direction of cleavage of the iodo-cinchonidine sulphate crystalline layer, I obtain a more perfect and uniform separation of the crystalline layer into the primary and secondary layer components. This is represented in Figure 17 with reference to the original coating direction of the primary crystal 235. $V_r$ is the relative velocity of the liquid level to the glass plate during the original coating operation, the relative velocity $V_r$ being normal to the liquid level L—L, as set forth in my copending application Serial No. 147,650, and my Patent No. 2,104,949. For iodo-cinchonidine sulphate the plane of polarization usually lies at 45° to the liquid level L—L and is indicated by the direction P—P of Figure 17.

Returning now to the most favorable direction of cleavage, the direction of cleavage preferably should be parallel to the original direction of the liquid level L—L. This results in a uniform cleaving action which everywhere leaves substantially the same thickness of crystal on the primary and secondary cleaved crystalline films. If cleavage be attempted in other directions, it usually results in uneven thicknesses from place to place on the primary and secondary cleaved films.

In Figure 17, I show a flexible sheet 230 in the process of being drawn away from another sheet 231. The crystalline layer 232 which is securely bonded between and to both sheets 230 and 231 is cleaved by this pull and splits along the line of the crystalline plane, leaving crystalline layers 234 and 235 on both sheets.

The cohesion between the successive crystalline lattice planes is less than the adhesion between the crystalline surfaces and their respective supports, and for this reason, the crystal cleaves in such a manner as to leave a complete crystalline framework upon each support. The crystal may cleave so that its thickness is approximately equal on each support, or unequal thicknesses may be separated, depending on conditions of operation. Under microscopic examination of the cleaved I. C. S.-a film, the film appears to cleave in such a manner as to leave a continuous crystalline layer on both supports, but the thickness of that layer appears to vary from place to place. However, as has been pointed out herein, the variation in thickness is obviated by subsequent intensification of the respective crystalline layer on both the primary and secondary supports. To the unaided eye under the conditions herein set forth, the cleaved crystalline film upon both primary and secondary supports appears as a quite uniform bright golden film which is approximately equally distributed upon both supports.

*Effect of differential stresses on cleavage*

I have discovered a very remarkable property which aids in cleavage of crystalline films. Starting with a continuous crystal coated upon a glass surface, after intensification the crystal surface is coated with a nitro-cellulose lacquer and this is allowed to dry. The nitro-cellulose lacquer surface is then again coated with a lacquer of polystyrene, a solvent being used this time having no dissolving effect upon the underlying nitro-cellulose layer. After the polystyrene layer of suitable thickness has dried, the splitting may be started by slitting the boundaries of the film with a sharp knife edge, whereupon cracks are observed to start inward a short distance all around. When the coatings above mentioned, have been suitably made the stripping may continue without additional tension being applied to the film. During this self-cleavage operation, the film is observed to make a considerable angle with the plane of the primary crystal. Analyzing these effects it is apparent that upon drying, the polystyrene film has been placed in a state of tension so that to remove this tension it must shrink. Moreover, the nitrocellulose in adherence to the underlying crystalline film prevents this shrinkage not only by its initial adherence to the rigidly supported primary crystal underneath, but because the nitro-cellulose has apparently less of a tendency to shrink than has the polystyrene. As a result the combined films of nitro-cellulose and polystryrene act in a manner similar to the well-known bi-metallic thermostatic device in which tension in one of the metallic strips being greater than tension in the other metallic strip caused the combined strip to bend. Just this effect occurs at the line of cleavage.

Referring now to Figure 17, 230, 233, 234 is the composite strip of polystyrene, cellulose nitrate and partial crystalline layer respectively, after cleavage, and 236 indicates the tension that exists in the polystyrene layer 230.

It is obvious that the effect above described would tend to occur as a result of the tendency to relieve the stress. Although the tension 236 is exerted in all directions relative to the line of stripping, as shown, it is obvious that the only effective direction can be normal to the line of cleavage in the plane of the strip. As a consequence of this very important effect, I obtain a more satisfactory cleavage with greater ease than is possible with a single stripping layer. Once the cleavage in the crystalline layer is initiated the tensioning effect of the polystyrene layer acts to facilitate the active cleavage and thus this tension effect of itself both maintains the cleavage along the initial plane and assists in the cleavage operation. While in many cases the cleavage can be self-acting, I have found that it is desirable to apply an additional separating force 237 which may however be very slight and have no tendency to tear the film, and may in many cases be merely a force sufficient to remove the film as it strips away. It will be noted that this type of stripping can apparently be performed without the inclusion of a liquid at the point of cleavage. Illustrative of the desirability of providing the correct relative position of the materials utilized at 230, 233 and 234 in an experiment wherein the polystyrene is first coated over the primary crystal base and the cellulose nitrate thereafter coated onto the polystyrene, upon drying and attempted stripping, it was found that the cellulose nitrate would tend to pull away from the polystyrene and thus failing to adhere to the polystyrene, effected no cleavage in the crystalline layer.

In Figure 19 I show a modified form of my invention in which I provide a continuous method of effecting the cleavage of the crystal onto a pre-formed receptive sheet. More specifically, I provide a rotating drum 240 which carries upon its surface a thin layer of crystalline material 241 which is constantly renewed by the super-saturated solution of the crystal 242 carried in a tank 243. The thickness of the polarizing crystal which is built up by the supersaturated solution 242 is controlled by means of the control apparatus 244. This light control apparatus projects a beam of revolving polarized light 245 through the transparent drum 240 and the crystal surface, and through the super-saturated liquid 242 which is contained in the transparent tank 243, into the photo-electric cell 246 which as described before in connection with Figure 1 controls the speed of revolution of the drum 240 and thus controls the thickness of the crystalline film deposited on the surface of the drum 240. The drum 240 with the crystalline layer 241 built up upon it travels up in contact with a blotter roll 248 which bloter roll acts to remove the excess of liquid on the crystalline layer. The dried crystalline layer then travels up and in contact with a rotating roll 249 which holds a pool of laminating oil 250 against the surface of the drum 240. The plastic is fed to this pool by means of a hopper 251. The polarizing film with the laminating oil on the surface thereof now passes up and in contact with a preformed polystyrene sheet 252 which may be a composite sheet of polystyrene and cellulosic derivative to give added strength which pre-formed sheet is delivered by the roll 253. The sheet 252 passes under the guiding roll 254 where it is pressed in contact with the crystalline layer 241 which is carried on the surface of the drum 240. Heating means 255 assists in the lamination operation.

The pressure contact between the pre-formed sheet 252 and the crystalline layer is maintained by the pressure rolls 256 and 257 and the lamination after being thoroughly pressed is cooled by the cooling means 258 in order to set the composite. The laminating oil 250 facilitates the firm bond between the sheeting 252 and the crystalline layer 241 while at the same time eliminating air bubbles from the lamination. The cleavage is effected by passing the sheeting 252 under the roll 260 where it may be separated from the drum in the presence of a liquid 261 which may for example be a saturated solution of the crystal in a suitable solvent. The roll 260 guides the angle at which the sheeting 252 is separated from the drum and maintains it at the optimum angle for effecting the cleavage of the crystalline layer 241 so that a portion of the crystalline layer adheres and travels on with the sheeting 252 and the remaining portion of the crystalline layer remains on the drum. The sheeting 252 with the crystalline layer then travels through a heated oven 259 in which the film is expanded. Longitudinal expansion is effected by means of the rollers 262, 263, 264 and 265 and this expansion is effected by rotating the rollers 263, 264 and 265 at progressively increased speeds. By this means a gradual longitudinal expansion is effected on the softened plastic sheeting. Lateral expansion is produced by manipulation of clamps 268 in a lateral direction in a manner well known to the art. The laterally and longitudinally expanded plastic sheet with the expanded crystalline film thereon is then cooled in the cooling chamber 269 so that the plastic film is set and then is carried through the intensifying solution 270 where the crystalline film is renewed, the cracks and fissures healed, and the thickness built up to a desired dimension. Here again control apparatus 271 and 272 operates to maintain the thickness of the built up crystalline layer on the plastic film at the proper dimension by regulating the length of exposure of the strip to the intensification solution. In this case this may be done by controlling the length of the film immersed in the solution rather than the speed of the drum as in previous instances. Specifically, this can be effected by laterally moving either one of the rollers 274 or 275 or by raising or lowering the level of the solution in the tank by control apparatus well known in the art. The built up polarizing crystal or plastic film is turned over at the point 280 so that the polarizing crystal now travels uppermost and is then prepared for lamination with a protecting film 281 by the laminating oil 282 which is fed from the hopper 283. The plastic film carrying the polarizing crystal thereon then travels between the pressure rolls 284 and 285 which effects a bond by absorption of the remaining laminating oil in the plastic film 281. The laminating film with the polarizing crystal in the center is wound upon a suitable storage roll.

In Figure 21 I diagrammatically show a lamination comprising a crystalline film 300 which may of course be a polarized crystalline layer and surmounting and immediately adjacent this crystalline layer 300 are, preferably thin, cellulose nitrate films 301 and 302 which follow the contours of the crystal surface. Superimposed on the thin cellulose nitrate films are polystyrene composition layers 303 and 304. Although the interfaces between 300, 301 and 304 are diagrammatically shown as straight lines they are in fact more or less irregular. Cellulose nitrate films 301 and 302 are indicative of the class which impart strength to the composite, whereas layers 303 and 304 are of a material which matches the index of refraction of the crystalline film and supplies suitable surfaces for the transmission of optical images without distortion.

In Figure 22 I illustrate a new method of laminating one or more plastic layers over a crystalline film 308 upon a support 309, which may be glass. Layer 310 may comprise a polystyrene-cumarone indene composition dissolved in a volatile solvent such as toluene, and this is utilized as a "laminating oil" to exclude air in laminating plastic 311 to the composite. Plastic 311, for example, may also be a polystyrene composition preformed film. The process is completed by the solvent diffusing through the plastic membrane 311 and evaporating from its surface as indicated by arrows 312. Results of extensive tests show that particularly under the influence of ultraviolet radiation most liquid plasticizers tend to deteriorate the I. C. S.-$a$ crystalline film 308; whereas when plasticizers are absent or present in small amounts no deterioration may occur.

Plasticizers are generally employed in lamination to exclude the air in the process of lamination, the excess being squeezed out, and the remaining plasticizer then absorbed into the body of the plastic used in the lamination, to which it imparts resilience and adherence. I have found that a satisfactory resilience and adherence can be obtained using mixtures of polystyrene with cumarone-indene or aroclor, or mixtures of all three. Here the liquid plasticizer is either absent or present in small amounts, thus preventing the deterioration of the I. C. S.-$a$ crystalline film. The problem of laminating such a layer over the crystalline film is solved by making a liquid "laminating oil" by dissolving these components in a vaporizable solvent as above described, and the finished lamination then contains no liquid plasticizer.

In Figure 23 I show a laminated structure in which my polarizing film is incorporated. This structure is substantially shatter-proof. The structure comprises a glass plate 316 which carries a polarizing film 315. Over the polarizing film is a layer of a suitable lacquer, 315' which may be cellulose nitrate, preferably, containing ester gum, and dioctyl phthalate as resin filler and plasticizer, respectively. I then laminate the cover glass 318 to the glass plate 316 carrying the crystalline layer 315 and the protective lacquer coating 315' by means of an intermediate core 319 of cellulose acetate or some suitable transparent plastic sheeting which carries on both surfaces a polystyrene-cumarone indene gummy bonding medium 317. The lamination is carried out by flowing or spraying on surfaces 315' and the cover glass surface 138 an oil comprising menthyl cinnamate containing six per cent beta-methyl naphthalene. The central core 319, has been suitably coated with the polystyrene-cumarone indene bonding medium, as for example by dipping, and then drying, whereupon this coated core is laminated to the cellulose nitrate coating of the base plate 316 by means of a wipping or rolling action in order to exclude air bubbles and excess laminating fluid. The cover glass is laid upon the top of the plastic core and the air is excluded together with the excess laminating oil in the same manner. The composite is then subjected to 100° C. for three minutes under a gentle pressure. The laminating oil remaining is absorbed into the polystrene-cumarone indene layers. The laminating oil pasticizes the said layers to a permanently elastic condition. The beta-methyl naphthalene acts to increase the penetrating action of the menthyl cinnamate into the polystyrene plastic layer, and moreover acts to repel water which might otherwise subsequently affect the lamination around the edges. Both menthyl cinnamate and beta-methyl naphthalene will not pass through nor affect the cellulose nitrate layer which covers the crystal 315, but these materials will suitably plasticize the polystyrene. The menthyl cinnamate also acts to absorb and screen out from the crystalline layer 315 ultraviolet light, which might deleteriously affect the crystal.

Further menthyl cinnamate and b-methyl naphthalene have a suitably high index which matches the index of refraction of the crystal 315 and the polystyrene-cumarone indene layer 317. The matching of the indices of refraction of the laminating oil with the polystyrene-cumarone indene layer and the crystalline material is important since the interfaces between these materials are usually slightly irregular and only by a perfect index match of all adjacent components can an aberration free structure result. The index match of the flat surfaces of the cellulose acetate core and the glass is not important since the interfaces of these material with the adjacent layers is perfectly plane and no aberration will result even though the indices of refraction be widely different.

The purpose of the cellulose nitrate layer 315' is to provide a membrane that is impermeable to the migration of the plasticizer from the polystyrene-cumarone indene plastic to the crystalline layer 315, since this plasticizer might tend to react with the crystalline material and affect it physically and chemically. Further it provides a membrane which prevents the escape of iodine and water vapors from the iodo cinchonidine sulphase crystalline material 315 which would tend to decompose the polarizing crystal.

The plasticized polystyrene-cumarone indene layers 317, which include the menthyl cinnamate and the b-methyl naphthalene is a permanently elastic medium. It has been observed that when a tensile stress is placed upon a unit area of the crystal surface when a certain value is exceeded, cleavage occurs. Ordinarily, when a rigid lamination is used between the cover glass and the crystal surface such cleavage may result from shock or from various stresses or strains which may be introduced as for example by flexing an optical lens in a frame. The construction set forth above overcomes the difficulties with the rigid lamination.

The principle of operation is to provide an elastic bond between the cover glass and the crystal surface of such elasticity that under ordinary strain, the stress per unit area set up is less than the critical breaking tensile strength of the cleavage planes of the crystal.

The cellulose acetate core, besides providing a convenient method of introducing the elastic medium and of laminating the elastic medium, also acts as a stress distribution medium. It is obvious that shock wave in travelling through an elastic medium can set up localized stresses per unit area which vary from place to place as the shock wave travels through the medium. However, if the elastic medium contains a central rigid distributing plate such as the relatively inelastic cellulose acetate sheet 319, the resulting tensile stress per unit area is less because of the better distribution of the forces resulting from the shock by the central distributing plate. The result is that the lamination provided by the above construction will provide a shatter proof lens which will withstand all ordinary usage and under breakage conditions, the glass will usually crack before the separation of the lens will occur, and moreover, the cracked pieces of glass will adhere to the central cellulose acetate core producing a true safety polarized glass.

I have noted that this central core 319 which is here described as composed of cellulose acetate should not be too thing to carry out its various functions, particularly the transmission of stresses. I have found, for example, that a thickness of .005 is suitable, although to obtain the optimum values this thickness may vary from .002 to .008.

In Figure 24, I show a composite comprising a crystalline layer 325 interposed between and supported by outer plastic layers 326 and 327 which may be composited as previously described. This plastic lamina is passed between two rolls, 328 and 329. Cleavage is initiated in a suitable plane V—V' in the crystalline film 325 and is continued by directing the plastic film 326 in one direction by the direction force indicated at 333 and the plastic film 327 by means of direction force 334 in a direction opposed from 333. The angles of separation of these plastic films, one from the other, are controlled by the direction of such forces and by the radii of co-acting rolls 328 and 329. A liquid 330 positioned directly at the point of cleavage of the crystalline layer facilitates that cleavage by means discussed hereinbefore.

The central line V—V' of Figure 24 may for this operation be in a vertical plane so as to retain liquid 330 between the cleaved films by the force of gravity. In some instances the cleavage may be satisfactorily performed without the presence of liquid 330.

Here is a method whereby a film may be divided into two films each of which can be further processed to produce the original lamination.

As shown diagrammatically in Figure 25, I have illustrated the multiple processing by means of which I utilize the operation shown in Figure 24 to indefinitely multiply the number of continuous crystalline films which may be produced from the initial crystalline film. Thus the film 336 which comprises the composite of crystalline layer between two plastic films is cleaved as shown in Figure 24 and the components 337 and 338 which comprise the plastic film, and a portion of the crystalline layer are further processed as at 339 and 340 to build up a crystalline layer to the desired thickness and to laminate that crystalline layer with a further plastic sheet to again form the composite such as that initially provided at 336. This composite is again cleaved and the components 341 and 345 are again processed at 342 and 346 to form the composite sheet such as 336. These composites may be further split ad infinitum to form crystalline sheets substantially the same as 336. In this manner, a single film may be multiplied indefinitely to provide an abundance of polarized sheeting from a single source.

In Figure 26 I diagrammatically represent a turn table 350 which carries suitable arms 351 adapted to rotate about a central shaft. At the end of the arms are carried out the respective operations of my process which are as follows: a glass plate 355 carrying a crystalline layer 356 which has been deposited thereon according to the processes set forth in my Patent No. 2,104,949 and my copending application Ser. No. 147,650 is coated with a layer of cellulose nitrate lacquer by means of the jet 357 which supplies the cellulose nitrate in standard solutions (comprising a mixture of butyl acetate, butanol and toluol in equal proportions which solution is saturated with I. C. S.-a crystals) onto the plate.

This saturation of I. C. S.-a crystals prevents the dissolution of the previously formed and deposited crystalline film on the glass plate 355. After the crystal covered glass plate is suitably coated with a layer 358 of cellulose nitrate, it is moved to its resting position and dried by means of hot air. After the volatile solvent has been substantially evaporated from the cellulose nitrate film, a second coating of a high index of refraction plastic material such as a polystyrene composition is applied, such polystyrene composition being dissolved in toluol only. This is because the toluol alone will not dissolve the underlying cellulose nitrate film. The polystyrene solution is applied through the jet 360 and forms a layer of polystyrene 361 on the composite comprising the support, crystalline layer and cellulose nitrate film. After this polystyrene solution has been properly applied over the plate, it is dried to remove the toluol solvent so as to form a solid layer of polystyrene composition over the cellulose nitrate film. The extreme edges of the film are trimmed as with a sharp edge to facilitate separation in the operation which is to follow and then a splitting or cleavage is initiated in the crystalline layer 356 again by the insertion of a sharp edge in the crystalline layer and by the exertion of an upward force, the film is readily cleaved away as indicated by the arrow and additionally assisted or facilitated by the tensional effects in the biplastic layer 358 and 361. The cleaved film 363 is then carried away from the primary crystalline film upon the support 364. The cleaved film 363 is then clamped in a suitable frame 366, whereupon it is intensified by having applied to the crystalline face only a supersaturated solution of I. C. S.-a, as previously described in a manner similar to that indicated at position 4.

The excess supersaturated solution is washed away and the surface of the crystal dried. The wash solution may be butyl alcohol saturated with I. C. S.-a.

After the crystalline layer has been built up to the desired dimensions and washed it is then coated with a suitable protecting layer such as polystyrene dissolved in toluol applied through the jet 368 which applied solution is dried so as to form a continuous solid protecting film.

Returning now to the treatment of the primary crystalline layer 364 on the original support, the next step is intensification as shown at position 4. At that point the supersaturated intensification solution 370 is applied from the container 371 onto the surface of the primary crystalline layer 364. In order to obtain a uniform renewal of the crystalline layer, I employ a rocking arrangement 372 which will be explained in detail hereinafter, and which serves to bring the supersaturated solution into intimate and moving contact with every exposed crystalline face. By using a moving contact of the renewing intensification solution with the crystalline layer, I obtain a much more uniform distribution of the supersaturated solution and moreover increase the speed with which crystallization may proceed. That is, accretion is more uniform and more rapid when the intensification solution is in moving contact with the face of the crystal.

In order to provide for the evaporation of the solvent of the supersaturated solution, I provide suitable currents of air or gas which are indicated by the arrows 373. Evaporation of the supersaturated solution causes a concentration to occur and maintains the state of supersaturation during the process of crystallization. In order to control the extent to which the partial crystalline layer 364 is to be rebuilt by the supersaturated solution, I provide a light actuated control 374—375 which has been previously described in connection with Figure 1. This light control is actuated by the thickness of the renewed layer so that when the proper predetermined thickness of crystalline layer has been reached the operation is automatically stopped and further intensification prevented. The operation is terminated by such an angular change of the rocking movement that effects this discharge of the intensification solution from the surface of the crystal. After this, the arms 351 rotate to the next position 5 at which point the renewed crystalline surface is washed by means of a wash solution of 3A ethyl alcohol and propyl alcohol in equal proportions, containing 10% water, the entire solution being saturated with I. C. S.-a. This wash solution is delivered through a jet 376. The action is first washing the excess supersaturated solution away from the surface and at first rapid evaporation of the wash solution and then constant evaporation of the small remaining amount to the uniform nondrop forming film.

In Figure 27 I have a detailed showing of the mechanical means by which I effect the rocking movement for the distribution of the supersaturated solution and also the radical angular change of the rocking movement to provide for the discharge of the supersaturated solution from the surface of the crystalline layer. It is necessary that there be a second rocking motion actuated for example by an eccentric circular cam 408, said rocking motion being at right angles to the above first mentioned motion. This second rocking motion, together with the first rocking motion, acts to better distribute the intensification solution and thus produce a uniform accretion from place to place over the crystalline surface.

On the support 380 I provide suitable metal supporting fingers 381 suitably secured to the support and held within the supporting fingers 381 is the rigid support 365 containing the partial primary crystal 364 face upward. I have found that it is desirable to construct the fingers 381 in such a way as to lift the supporting plate 365 a short distance above the rocking structure 380. The metallic fingers are thin and contain a cut-out ridge in which the plate may rest.

It is essential that I maintain the primary support 365 and the crystalline layer spaced from the rocking support 380 because I have found that unless this spacing is maintained, I obtain certain undesirable results with regard to my supersaturated solution. That is, I have found that the solution which gathers at the edge of the plate and there crystallizes, loses its supersaturation. I have found that when the rocking support is allowed to come into direct contact with the edge of the plate, the excess supersaturated solution which spills over there may be retained for some time during which crystallization may occur, resulting in a reduction in the supersaturated condition of the liquid, whereupon during the next rocking motion, this undersaturated solution may flow back upon the plate causing either a retardation of the intensification or an actual solution of the previously deposited crystalline surface. This undesirable effect may be readily overcome in the simple manner above described by providing to offset the primary crystalline structure by means of the thin metal fingers 381.

The rocking motion is effected by means of lever arm 404 which is affixed to the shaft 383. The usual rocking motion is shown diagrammatically as limited by lines 385 and 386 about a central horizontal positioning line 387. This is the working angle at which the supersaturated solution is flowed back and forth upon the partial crystalline layer on the plate.

In determining the angle between the lines 385 and 386 the period of rocking is taken into account and the angle between 385 and 386 is so related to the rocking period and to the viscosity of the solution that the supersaturated solution 388 upon the upper surface is just able to travel in an advancing wave formation 389 from one end of the plate without spilling over the edge.

The surface tension is sufficient to retain most of the liquid upon the upper surface of the support during this operation. When the proper amount of intensification and renewal has been effected I alter the angle of rocking to the mean position 390 during which time the rocking motion of the plate is limited by the line 391—392 so that the intensification solution is discharged from the surface.

Illustrative of this type of mechanism which may be employed to accomplish this result is the mechanism shown in connection with this figure. I may provide for instance a rotating arm 395 containing a shaft 396. The ends of links 397, 398 are rotatably carried by the shaft 396. The other end of link 397 is pivoted to link 399 at 400 by means of the pin 401. Link 399 also carries an offset handle 402. One end of link 399 is attached at 403 to the rocker arm 404 which is attached to the shaft 383 so that the rocking motion is transmitted to the rocker support, 380. The other end 405 of link 399 is yieldably attached by a spring 406 to link 398. By means of this arrangement I can either provide the usual rocking movement as at 387 or by moving the handle 402 to the dotted line position 407, I can provide the tilted rocking motion about the line 390. The manner in which this occurs will be obvious upon inspection of this figure. In brief it is simply that the point 403 is moved closer to the shaft 396 by virtue of the shortening of the distance therebetween owing to the tilting of the handle 402 to the position 407. When the arm 402 is released, the rocker reassumes its usual rocking position about the plane 387.

The second rocking motion which is at right angles to the above described rocking motion is provided along the line 383, and is accomplished by providing the eccentric cam 408 which is fixed to the sleeve 384 which rides over the shaft 383 and revolves in the brackets 409, 409'. The sleeve 384 is driven by a suitable belt drive as indicated. A key pin in the bracket 409' effects the first mentioned rocking movement and the vertical movement of the support at one end is induced by the eccentric cam 408 which alternately moves up and down the bracket 409 and with it the fixed support.

In Figure 28 I show means for constantly providing a supersaturated intensification solution 410 which corresponds to the intensification solution 370 shown in Figure 26. There is directed through this supersaturated intensification solution 410 a light beam 411 from a light source 412. Normally this light beam 411 passes through the transparent or substantially translucent solution 410 which is in a state of supersaturation. In the course of supplying the supersaturated solution as for example by the tilting of the flask, if some liquid shall run back into the supersaturated solution containing some crystals, the supersaturated solution would then commence to crystallize out and when it then contains a certain number of crystals per unit volume, it is no longer in suitable condition for application to the surface of the cleaved or primary crystal for the purpose of renewing or thickening the crystalline layer thereon. It is therefore necessary at this point to provide a fresh supply of supersaturated solution and to bring the crystallizing solution again into a suitable supersaturated condition for subsequent use. When the aforesaid crystals have formed in the solution the light beam 411 is reflected by the crystals 413 in a diverging beam 415. Some of these rays 415 are picked up by the photo-electric cell 416 which then actuates the device so as to remove the flask 410 from its working position and replace it with flask 417 which contains a fresh supersaturated solution 418. Flask 410 is moved into position 419 and emptied by tilting into container 420 which is heated by means of, for example, a gas jet 421 to a suitable temperature which for example, may be 70° C., the upper limit of temperature being controlled by thermostat 422 which acts to reduce the amount of gas flow passing through the electromagnetic valve 423, thus maintaining the liquid in container 420 at a sufficiently high temperature to fully dissolve all crystalline material which may enter the solution from the flask 419. A pump 424 pumps the liquid from container 420 to the container 424 wherein it is cooled to incipient supersaturation by means of cooling coils 426. The liquid 425 is agitated by agitator 427 and the extent of the cooling is limited by the thermostat 428 which controls the electromagnetic valve 429, which in turn controls the cooling liquid supply through the cooling coils 426. The valve 430 at the bottom of the container 425 may be actuated to fill flask 417 with solution at incipient supersaturation. Upon striking the cooler flask 418, the liquid which may be at incipient supersaturation (for example 55°) thereupon is cooled to supersaturation, that is, for example 45° C. and will in this condition maintain itself without crystallization for periods of time up to 30 to 60 minutes, even when position 410 is being used for intensification. The entire process being cyclic, the operation once initiated at 410 proceeds one operation forward at each step in the cycle. Thus upon actuation at 410 the flask then in position at 419 moves to the position shown at 431 in which place the flask is dipped into an unsaturated liquid 432 which is in container 433 which acts to thoroughly dissolve and thoroughly clean the flask. For example a solution of 3A alcohol acidified with a vaporizable acid such as HI or HCl will quickly dissolve and clean the flask. The next operation is to completely dry the new clean flask which may be accomplished for example, by immersion in an atmosphere of steam at 434. The clean and heated flask upon slowly moving from position at 434 to 417 will be perfectly dry and will be air cooled by air blast 436 before moving into position 417.

In Figure 29 I show an apparatus for producing a laminated and expanded toric shaped polarizing film composited on to a glass lens. Held in a suitable chuck 450 is a member 451 bearing a drum member 452. The drum member 452 has openings 453 about its periphery through which pass suitable securing bolts 454 retained by nuts 455. Held in the drum member 452 by means of cardboard washers 456 is a layer of cleaved film 457. It will be understood that the various components of my composite are shown in greatly enlarged form for the purpose of clarity.

Positioned below the crystalline film 457 and coated thereon is a thin layer of cellulose nitrate 458 which acts as a barrier to prevent plasticizers and solvent from striking through to and effecting the crystalline film 457. Held in the drum member immediately beneath the cellulose nitrate layer is the layer of polystyrene 459.

Referring now to the die member 460 which is heated by the chamber 461 through which passes either cooled or heated fluids, a lens 463 is set into a suitable seat 464 in said die member 460. The convex surface of this lens is first coated with a polystyrene film 466 which polystyrene film contains 5% b-methyl naphthalene as a plasticizer to prevent crystallization. A thermoplastic laminating oil 467 consisting of 90 to 95% aroclor and 5 to 10% b-methyl naphthalene is employed to obtain perfect fusion between the polystyrene layers 466 and 459. A slight excess of thermoplastic laminating oil is employed so that when the crystalline film held in the drum 452 is brought down over the toric surface of the lens 463, the excess of the laminating oil is squeezed out, carrying with it the undesired air bubbles.

When the drum is brought down, the crystalline film is stretched and expanded laterally. The film is further given the toric shape of the toric lens 463. When proper expansion and shaping has been effected during which the heat is imparted to the composite by means of the heating chamber 461, the heat is shut off and a cooling liquid is flowed through the chamber in order to set the composite. As a result of the expansion and shaping, the crystal layer 457 has been cracked and it is now necessary to intensify the exposed crystal surface to restore its continuity. This is effected by the supersaturated intensification solution described hereinbefore. The excess of the intensification solution is washed away with butyl alcohol; then cellulose nitrate (alcohol soluble) lacquer in butyl alcohol with 10% ethyl lactate is flowed over the intensified crystal surface leaving when dry a thin impermeable cellulose nitrate film coating over the crystal.

Thus, as the final product I produce an expanded and shaped crystal layer having superior orientation properties with respect to the crystal alignment therein, which crystal is protected on each side by a thin impermeable cellulose nitrate lacquer and which is joined by means of a coalesced polystyrene layer to the toric lens.

In Figure 30, I show the system providing heated fluid to the pressure chamber 461 and means whereby the heated fluid can be shut off and cooled liquids transmitted thereto. It is believed that the diagram is self-explanatory and it will be noted that the temperature is controlled by means of a thermostat 470 which is immersed in the heated fluid 471. The various cut-off valves allow either for the direct flow of the heated fluid through the by-pass system or the chamber 461. It will be noted that the constriction 472 will cause the heated fluid to flow through the chamber rather than through the by-pass pipe 473 when the proper valves are open.

When desired the suitable valves can be opened and the hot water system valves closed to provide for the circulation of cooling fluids through the chamber 461.

The foregoing detailed description of my invention, it will be understood, has been given by way of example only, and I intend to be limited not by the details hereinbefore set forth, but only by the claims hereto appended.

I claim:

1. A cleaved polarizing crystalline layer.
2. A cleaved polarizing layer of iodo cinchonidine sulphate-a.
3. The process of forming a crystalline film which comprises coating a crystalline layer having a multiplicity of cleavage planes with an adherent material, the adhesion of said material to said crystalline layer being greater than the cohesion of said crystal cleavage planes, substantially drying the adherent material and stripping the adherent material from the crystalline layer so as to cleave the crystalline layer, a lateral section of said crystalline layer being carried off by said adherent material.
4. The process of forming a crystalline film which comprises pressing an adherent material onto a crystalline material to adhere the adherent material thereto, the crystalline material having a multiplicity of cleavage planes, the adhesion of said adherent material to said crystalline material being greater than the cohesion of said crystal cleavage planes, and stripping the adherent material from the crystalline material so as to cleave the crystalline material.
5. The process of forming a crystalline film which comprises adhering a crystalline layer having a multiplicity of cleavage planes to an adherent support, the adhesion of said support to said crystalline layer being greater than the cohesion of said crystal cleavage planes, and stripping the adherent support from the crystalline layer so as to cleave the crystalline layer, and subjecting the cleaved crystalline material to a crystalline solution that is at least saturated to build up the crystalline material to a desired continuity and thickness.
6. The process of forming a crystalline film which comprises depositing a crystalline layer from solution onto a support, the crystalline layer having a multiplicity of cleavage planes, applying an adherent material to the crystalline layer, the adhesion of said support to said crystalline layer being greater than the cohesion of said crystal cleavage planes, stripping the adherent material from the crystalline layer so as to cleave the crystalline layer, the direction of cleavage being substantially parallel to the liquid level of the solution during the deposition of the crystalline layer.
7. Means for continuously producing a crystalline film which comprises an inert base coated with a crystalline layer having a multiplicity of cleavage planes, means for subjecting said crystalline layer to contact with a crystalline solution which is supersaturated, means for coating said crystalline layer with an adherent material, the adhesion of said material to said crystalline layer being greater than the cohesion of said crystal cleavage planes, and means for stripping said adherent material from said crystalline layer so as to cleave said crystalline layer, said adherent material carrying a portion of said crystalline layer off from said inert base.
8. Means for continuously producing a crystalline film which comprises an inert base coated with a crystalline layer having a multiplicity of cleavage planes, means for subjecting said crystalline layer to contact with a crystalline solution which is at least saturated, means for coating said crystalline layer with an adherent material, the adhesion of said material to said crystalline layer being greater than the cohesion of said crystal cleavage planes, and means for stripping said adherent material from said crystalline layer so as to cleave said crystalline layer, said adherent material carrying a portion of said crystalline layer off from said inert base, and means for intensifying said crystalline layer on said adherent material.

9. A process of forming a multiplicity of crystalline layers from a single original crystalline layer which comprises laminating a crystalline layer having a multiplicity of cleavage planes between two adherent flexible sheets, the adhesion of said adherent flexible sheets to said crystalline layer being greater than the cohesion of said crystal cleavage planes, pulling said two adherent flexible sheets apart to cleave the crystalline layer therebetween into two portions, one of which adheres to each of said flexible sheets, adhering a flexible sheet to each of said cleaved crystalline layers and again pulling said flexible sheets apart to cleave the intermediate crystalline layer into two portions, one of which adheres to each of said flexible sheets.

10. A process of forming a multiplicity of crystalline layers from a single original crystalline layer which comprises laminating a crystalline layer having a multiplicity of cleavage planes between two adherent flexible sheets, the adhesion of said adherent flexible sheets to said crystalline layer being greater than the cohesion of said crystal cleavage planes, pulling said two adherent flexible sheets apart to cleave the crystalline layer therebetween into two portions, one of which adheres to each of said flexible sheets, intensifying said cleaved crystalline layers, adhering a flexible sheet to each of said cleaved crystalline layers and again pulling said flexible sheets apart to cleave the intermediate crystalline layer into two portions, one of which adheres to each of said flexible sheets, and intensifying said cleaved crystalline layers.

11. The method of improving a polarizing crystal which comprises mounting said crystal on a support which can be expanded, laterally expanding said support and said crystal in at least one direction so that said crystal is extended and made discontinuous and subsequently intensifying said expanded crystal to repair cracks developed in the crystal during the expanding step and to build said expanded crystal to a desired continuity and thickness.

12. The process of forming a polarizing crystalline layer of non-planular shape which comprises molding and laterally expanding a crystalline layer to a non-planular shape, said crystalline layer being extended and made discontinuous and setting the crystalline layer in the desired non-planular shape.

13. The process of forming a polarizing crystalline layer of toric shape which comprises laterally expanding into a toric shape a polarizing crystalline layer mounted on a plastic support, said crystalline layer being extended and made discontinuous, setting the plastic support in the toric shape and subjecting the crystalline layer to an intensification solution to repair cracks developed in the crystal by the expanding step and to build the expanded crystalline layer into the desired continuity and thickness.

14. A polarizing crystalline layer comprising a lateral section of a larger polarizing crystalline layer.

15. A polarizing crystalline layer comprising a lateral section split off from a larger crystalline layer.

16. The process of forming a crystalline film which comprises adhering a crystalline layer having a multiplicity of cleavage planes to an adherent support, the adhesion of said support to said crystalline layer being greater than the cohesion of said crystal cleavage planes, and exerting sufficient force on said adherent support to cause a splitting of said crystalline layer, a certain lateral section of said crystalline layer being separated and carried off by said adherent support from said crystalline layer.

17. A polarizing element comprising in combination a lateral section of a polarizing crystal, and on one side thereof a crystalline accretion deposited thereon from solution and on the other side thereof a support adhesively secured thereto.

18. A polarizing element comprising in combination a lateral section of a polarizing crystal, and on one side thereof a crystalline accretion deposited thereon from solution and on the other side thereof a plastic support adhesively secured thereto.

ALVIN MARKS.